US008000279B2

(12) United States Patent
Noisette et al.

(10) Patent No.: US 8,000,279 B2
(45) Date of Patent: Aug. 16, 2011

(54) SYSTEM FOR MULTICAST BROADCASTING TOWARDS AT LEAST ONE ROAMING USER TERMINAL IN A MOBILE IP NETWORK

(75) Inventors: Yoann Noisette, Mays sur Orne (FR); Luc Beloeil, Douvres la Delivrande (FR); Sébastien Auvray, Issy-les-Moulineaux (FR)

(73) Assignee: France Telecom, Paris (FR)

( * ) Notice: Subject to any disclaimer, the term of this patent is extended or adjusted under 35 U.S.C. 154(b) by 1041 days.

(21) Appl. No.: 11/793,146

(22) PCT Filed: Nov. 28, 2005

(86) PCT No.: PCT/FR2005/002954
§ 371 (c)(1),
(2), (4) Date: Jun. 14, 2007

(87) PCT Pub. No.: WO2006/067287
PCT Pub. Date: Jun. 29, 2006

(65) Prior Publication Data
US 2008/0225769 A1   Sep. 18, 2008

(30) Foreign Application Priority Data

Dec. 17, 2004  (FR) ..................................... 04 13524

(51) Int. Cl.
*H04H 20/71*    (2008.01)
*H04W 4/00*     (2009.01)
*H04W 36/00*    (2009.01)

(52) U.S. Cl. ..................... 370/312; 370/328; 455/432.1; 455/440

(58) Field of Classification Search .................. 370/312, 370/328; 455/432.1, 440
See application file for complete search history.

(56) References Cited

U.S. PATENT DOCUMENTS

| 6,741,575 | B1 | 5/2004 | Zhang et al. |
| 6,804,221 | B1 * | 10/2004 | Magret et al. ................. 370/338 |
| 2003/0095523 | A1 | 5/2003 | Korus et al. |

FOREIGN PATENT DOCUMENTS

| JP | 2004-260317 A | 9/2004 |
| WO | 00/79734 A | 12/2000 |

* cited by examiner

*Primary Examiner* — Marisol Figueroa
(74) *Attorney, Agent, or Firm* — Young & Thompson

(57) ABSTRACT

A system for multicast broadcasting towards an IP network mobile system. Upon connection of the mobile router and transmission of a signalling to the site of origin, the method includes discriminating the location of a mobile router with regard to the respective site of the organization of origin; transmitting to an infinity of locations; then for each assess request of a mobile terminal, local multicast broadcasting; substituting the access request, if the location information designates a connection of outside the respective site thereof coming from the organization of origin, with a request for access to extend multicast broadcasting; transmitting the request for access to extend multicast broadcasting; receiving and transforming, at level, the extended multicast broadcast into local transformed multicast broadcast and transmitting the locally transformed multicast broadcast on the IP mobile network to the requesting user terminal.

16 Claims, 12 Drawing Sheets

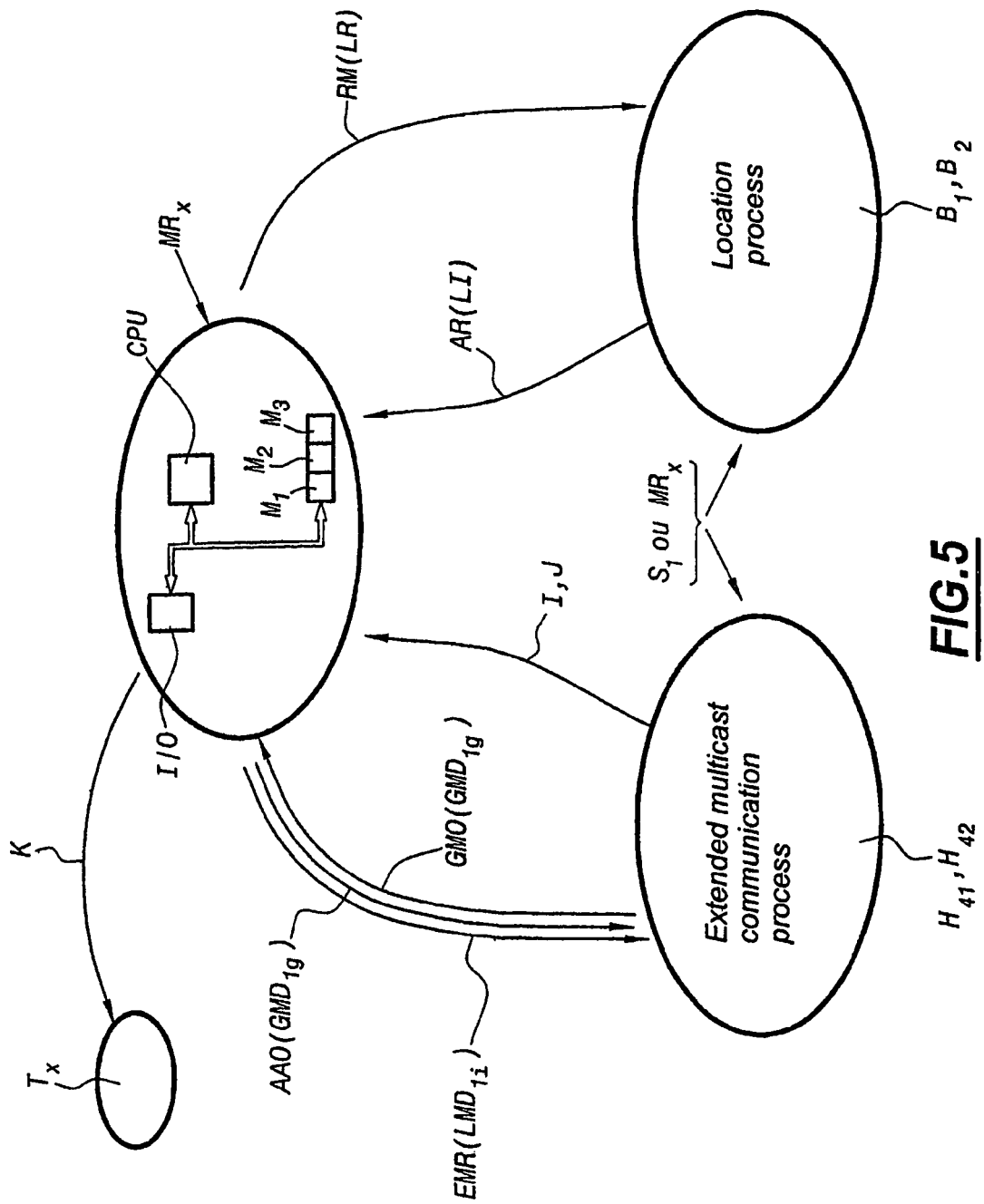

SYSTEM FOR MULTICAST BROADCASTING TOWARDS AT LEAST ONE ROAMING USER TERMINAL IN A MOBILE IP NETWORK

The invention relates to a method for broadcasting, to mobile user terminals on a mobile IP network, a multicast communication local to their home site.

The method, that is a subject of the invention, is intended to be implemented to benefit any entity, possibly multisite entities, equipped with a telecommunication network formed, at least partly, by mobile IP networks.

Such an entity can, for example, be a public transport operating company, for which the vehicles, buses, trams, trains, and even special vehicles, are equipped with moving mobile terminals capable of being connected from any place to the IP network. Such an entity is also considered capable of having IP multicast communication resources.

The operator network of this entity or enterprise, which can be a multisite enterprise, is an IP network enabling the multicast communication process to be implemented.

With reference to recommendation RFC 2365, it is recalled that there are three types of multicast communication.

For any user mobile terminal belonging to and registered on a home site, the abovementioned multicast communication types cover:
- broadcasts private to the home site, also referred to as site-local broadcasts, which are made only to users originating from and referenced in this home site. Under no circumstances do these broadcasts pass from one site to another site belonging to the same organisation;
- broadcasts private to the home organisation, typically private or local to the entity or enterprise, also referred to as organisation-local broadcasts. Under no circumstances do these broadcasts pass to outside the home organisation;
- global broadcasts. These broadcasts can be broadcast over the public IP network, in particular over the Internet.

The various types of multicast communication mentioned above involve a very tight constraint on the access restrictions, also referred to as subscription conditions, for any mobile terminal belonging to a site and to a home organisation, according to the place where the mobile terminal connects to the IP network.

One aspect of the present invention is to define and establish a method allowing any user mobile terminal, referenced on a home site, to automatically access, or subscribe to, the desired broadcast according to the position of the mobile IP network, in relation to the home organisation and/or to the home site, to which this mobile terminal is actually connected.

Another aspect of the method according to the invention is the implementation of IP multicast communication and NEMO (Networks in Mobility) processes, this process being based on mobile IP technology, the mobile IP networks of the entity or enterprise implementing NEMO technology.

The following is recalled in relation to NEMO technology and with reference to FIG. 1a.

The abovementioned technology handles access to IP networks for mobile terminals the mobility of which results in a change in the point of attachment or connection to the Internet.

Such access scenarios can typically be encountered for any onboard installation, in particular in the field of train or aeroplane transport. In the context of NEMO technology, the equipment and resources forming this network in this access configuration are considered to be a group which is connected to the Internet by virtue of at least one item of equipment called a mobile router MR.

One of the fundamental presuppositions of NEMO technology is that the type of network thus formed, in the context of these access conditions, is always a network referred to as a "leaf" or network terminal, i.e. a network which never assumes the role of conveying traffic between two other networks to which the latter would be connected.

Such a rule however fails to recognise the fact that such a mobile network most often has several points of connection to the Internet, either through a mobile router with several connected interfaces, by means of radio access terminals of a different technology for example, or through several separate mobile routers.

With reference to FIG. 1a, in the case of a mobile network containing a certain number of connected mobile terminals such as a train linked and connected to the Internet by radio link, this link changes as the train moves. The point of attachment or connection of the train to the Internet then changes, bringing about at IP level a modification to the configuration of the subnetwork to which mobile router MR is connected. NEMO technology enables this change to be managed and made transparent for moving mobile terminals connected to this mobile network in order that the communications and transactions taking place, in particular with the outside, are maintained.

What actually happens is that NEMO technology establishes a communication tunnel TU between the mobile router MR of the mobile network, formed by the train and the mobile terminals transported by the train, and the site at the home point of attachment HA, also referred to as Home Agent, in the context of NEMO technology, this communication tunnel being implemented, if necessary, via an intermediate point of attachment RA then used by the mobile router MR to maintain the communications and transactions. In the example of FIG. 1a, the home agent HA can be located at the originating station of the train. The communication tunnel is therefore successively modified as the mobile network moves and in particular changes point of attachment RA, RA'.

The mobility of the mobile network is managed by the mobile router MR and is therefore completely transparent for mobile terminals belonging to the mobile network. The communications and transactions executed by the mobile terminals continue regardless of their movement as if these mobile terminals were located and connected to their home site.

In particular, regarding the management of multicast streams, the mobile terminals transmit their request normally to the mobile router MR and the abovementioned multicast streams flow through the tunnel running between the mobile router MR and its home agent HA.

The abovementioned method of operation of NEMO technology provides for accessing broadcasts local to the home site of mobile terminals belonging to the mobile network. However, they do not take full advantage of the multicast function since the communication and transaction traffic makes no use whatsoever of a multicast communication tree, but rather uses as many successive tunnels as there are positions of the mobile router MR relative to intermediate access points of attachment on the Internet network.

Various developments have been envisaged with a view to proposing an improvement to multicast communication in the context of NEMO technology.

A first development was proposed by the company Motorola with a view to, on the one hand improving the method of operation of NEMO technology, and on the other hand delivering multicast streams to mobile terminals in a mobile IP network. The solution recommended by this development, as illustrated in FIG. 1b, involves introducing an MLD/IGMP proxy function at the mobile router MR, as is described, for fixed routers, in the IGMP-Proxy specification available at the following Internet site: http://www.ietf.org/internet-drafts/draft-ietf-magma-iqmp-proxv-04.txt
A terminal on the mobile network accesses the mobile router MR and the Internet network via an RIGMP/MLD request.

The abovementioned solution enables the mobile router MR to collect information on membership of a multicast group within the mobile IP network in order to then access or subscribe to these groups using its own name, under its own IP address, from the network to which it is connected. For the latter step, the mobile router MR then behaves and acts as would a mobile node formed by a mobile or fixed terminal on a mobile network MN in a visited network.

This solution was tested as part of the OverDRiVE project on a LIVSIX IPv6 stack, the technical aspects of which can be viewed at the Internet sites http://www.ist-overdrive.org and http://www.nal.motlabs.com respectively, and the solution was made public at a conference held in Turin, Italy, in December 2003, the reports of which can be viewed at the Internet site http://www.comnets.rwth-aachen.de/~o drive/HyWiN2003/index.html. Finally, the solution provides for dispensing with the need to create a communication tunnel between the mobile router MR and the home agent HA, by direct access to the multicast source MS for the public multicast communications that the mobile terminals on the mobile IP network wish to access or subscribe to.

A second development in a similar context forms the subject of French patent application FR 03 14639 filed on 12 Dec. 2003 in the name of the applicant and entitled "Method and system for multicast broadcasting towards a roaming terminal according to the location thereof".

The object of this second development is to define the method of operation required for combining a process for locating a roaming mobile terminal connected to any fixed network and a method for accessing or subscribing to a multicast communication restricted to a site to which this roaming mobile terminal is not connected.

This development applies only to a single roaming mobile terminal which must take into account its own location so that its access or subscription protocol is executed successfully.

With reference to the abovementioned French patent application FR 03 14639, the aspects essential to the method implemented by this second development will now be reviewed.

When the mobile terminal connects to a network, a process for locating this connection is activated automatically in order to discriminate and determine via a location variable whether the mobile terminal in question is connected either to its home site or network, or to another site of its home organisation, or to a site outside its home organisation, on the public Internet.

Upon request by the mobile terminal for access or subscription to a multicast communication group, the address of which is G, the method manages the requested access based on the address G.

If the address G is a global multicast communication address, the connected mobile terminal transmits in the normal way its request for access or subscription to the address G at its place of access.

If the address G is a broadcast address local to its home organisation, the terminal takes the value of the location variable into account:

if the mobile terminal turns out to be connected to a network of its home organisation, it transmits in the normal way its request for access or subscription to the address G;

if the mobile terminal turns out to be connected to a network outside its home organisation, the mobile terminal starts the process for accessing or subscribing to a multicast communication local to its home organisation and contacts the machine of its home site managing subscriptions of moving mobile terminals, which machine then transmits back to it another group public address G2 for global multicast communication, providing the requested access or subscription. The mobile terminal transmits an IGMP request with the public address G2.

If the address G is a multicast communication address local to its home site, the terminal takes the value of the location variable into account:

if the mobile terminal turns out to be connected to a network belonging to its home site, it transmits in the normal way its request for access or subscription to the address G;

if the mobile terminal turns out to be connected to a network of another site belonging to its home organisation or not belonging to its home organisation, the mobile terminal starts the sui generis process for accessing or subscribing to a multicast communication local to its home organisation, which process is referred to as an extended multicast communication, and contacts the machine of its home site managing subscriptions of moving mobile terminals, which machine then transmits back to it another public group address G2 for global multicast communication, providing the requested access or subscription. The mobile terminal transmits an IGMP request with the public address G2.

The first and second developments described above exhibit the following drawbacks resulting from unresolved technical problems.

The drawback in the default processing of the multicast stream by NEMO technology arises from the fact that any multicast stream makes use of the communication tunnel between the home agent HA and the mobile router MR, without drawing any benefit from the possibility of constructing a multicast communication tree on the network to which the mobile router MR is connected.

The first development mentioned above brings about a first response which in the end leads to constructing a true multicast communication tree for broadcasting streams to terminals on a mobile IP network, a solution that is particularly well suited to global-mode multicast streams.

The limitation of the solution proposed by this first development appears when the multicast communications have a reduced range, typically when private broadcasts to the home site or to the home organisation are concerned, i.e. in the end within and on the enterprise network. The multicast communication cannot be carried out as such using the first development mentioned above, which is unsuitable for private broadcasts.

The only option remaining in this situation is therefore to execute the private multicast communication according to default NEMO technology processing, i.e. using a communication tunnel linking the mobile router MR to the home agent HA and, consequently, without using the options provided by the multicast communication mode.

The drawback of the second development mentioned above, and subject of French patent application FR 03 14639, does not arise from a technical fault in the latter but only from the solution to a different technical problem. Specifically, in this second development, the aspects implemented actually apply not to a mobile network, able to have a plurality of fixed or mobile terminals in this network, but to a roaming mobile terminal connecting to a fixed network.

The abovementioned mechanisms or processes enable this roaming mobile terminal to resolve the location of its connection, to subscribe to or access a broadcast restricted to a site to which it is not connected, and to link the location resolution and access or subscription processes to a restricted broadcast using the machine of its home site which manages accesses or subscriptions of moving terminals. The technical problem solved by this second development is therefore fundamentally different from that concerning a plurality of terminals attached to IP subnetworks, the characteristics of which vary due to the overall mobility environment. Specifically, in the case of a mobile network, the mobile terminals, which are moving or fixed in the framework of the mobile IP network and which are connected to the latter, do not have any awareness of the mobility of the network, which mobility is entirely managed at the mobile router MR.

One object of the present invention is to address the drawbacks and limitations of the first and second developments of the prior art by nevertheless making use of some aspects of the processes implemented by these developments.

In particular, one object of the present invention is to implement a method for managing both the field of operational action of any moving mobile router of information and the private multicast communication in an optimised manner to any receiving and source mobile terminal belonging to these subnetworks.

Another object of the present invention is to implement a method and an associated operating process enabling a fixed or moving mobile terminal belonging to a mobile IP network to automatically subscribe to or access the required broadcast, local or otherwise, according to the location of the mobile IP network in which it is connected.

Another object of the present invention is to realise a mobile router for implementing the abovementioned method in a completely transparent manner, as in the case of a fixed IP network, this multicast communication process being implemented to the advantage of user terminals connected to the mobile IP network, regardless of where it is connected.

The method of multicast communication to at least one user mobile terminal on a mobile IP network, via a mobile router equipped with functions for controlling and transmitting accesses by any user terminal to any multicast type broadcast, subject of the present invention, is notable in that, after this mobile router connects to the IP network and after a signalling message is transmitted from this mobile router to its home site, the method involves at this home site, discriminating the location of this mobile router in relation to its home site, respectively to its home organisation, and transmitting to this mobile router an item of location information. It additionally involves at this mobile router, for any request by a user mobile terminal on the mobile IP network requesting access to a group multicast communication and relating to a multicast communication local to the home site, respectively to the home organisation, of this requesting user mobile terminal, substituting for this access request, when this location discrimination information indicates a connection of this mobile router outside its home site, respectively outside its home organisation, a request for access to an extended multicast communication providing access to this local multicast communication, transmitting, to this home site, this request for access to an extended multicast communication, receiving and transforming at this mobile router this extended multicast communication into a local transformed multicast communication, and transmitting this local transformed multicast communication over the mobile IP network to at least this requesting user mobile terminal.

Another object of the invention is to realise a mobile router equipped with functions for controlling and transmitting requests by any user mobile terminal connected to a mobile IP network for access to any multicast type broadcast managed by this mobile router, this mobile network including at least one connected user mobile terminal. It is notable in that it includes at least a module for discriminating the type of multicast communication transmitted by this requesting user mobile terminal, a module for substituting, according to a location variable of the connection of this mobile router outside its home site, respectively outside its home organisation, for any request for access to a group multicast communication to the home site and relating to a multicast communication local to the home site, respectively to the home organisation, of this mobile terminal, a request for access to an extended multicast communication providing access to this local multicast communication, and a module for transforming any received extended multicast communication into a local transformed multicast communication.

The method of multicast communication to at least one user mobile terminal on a mobile IP network, via a dedicated mobile router, subjects of the present invention, are applied to the management of IP-network-based telecommunications of mobile terminals connected to enterprise mobile IP networks, such as in particular fleets of railway vehicles or other.

They will be more clearly understood on reading the following description and on examining the drawings in which, in addition to FIGS. 1a and 1b relating to the prior art, FIG. 2a represents, by way of illustration, a flow chart of the steps essential to implementing the method of multicast communication to at least one user mobile terminal on a mobile IP network, in accordance with the subject of the present invention;

FIG. 2b represents, by way of illustration, a detail in the implementation of the steps of the method, that is a subject of the invention, as represented in FIG. 2a;

FIG. 5 represents, in the form of a functional model, a dedicated mobile router enabling the method that is a subject of the present invention to be implemented;

The method of multicast communication to at least one user mobile terminal on a mobile IP network, in accordance with the subject of the invention, will now be described in more detail with reference to FIG. 2a.

With reference to the abovementioned drawing, there is considered a mobile terminal T belonging to a home site $S_1$ and of course to a home organisation $O_0$, this mobile terminal, depending on the movement of the user U of the latter in particular via a mobile network MN and via a mobile router MR associated with the latter, being led to a foreign site $S_x$ and to connect to the foreign site $S_x$ via the aforementioned mobile router MR.

It is noted in a general way that the foreign site $S_x$ may or may not belong to the home site and/or to the home organisation $O_0$ to which the mobile router MR is attached.

Figure 2A:
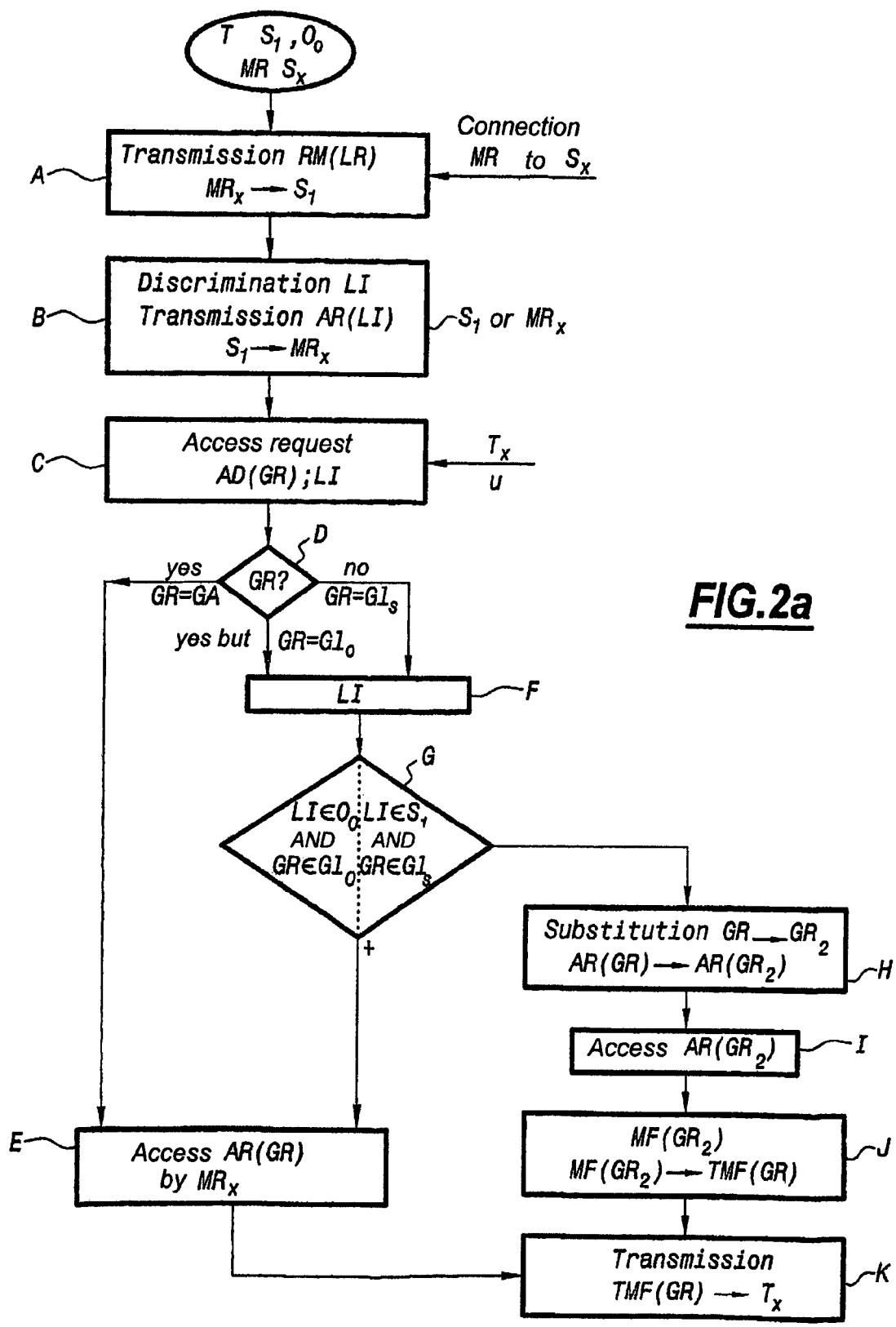

With reference to FIG. 2a, the step A of connection of the mobile router MR to site $S_x$ is represented as being independent of the initiative by the user U, of the terminal T, mobile router MR then assuming the label $MR_x$ due merely to the connection of this mobile router to the abovementioned foreign site $S_x$.

Due merely to this connection, and conventionally, mobile router $MR_x$ thus connected is in a position to transmit, if necessary, a signalling request message from this mobile router to the home site $S_1$, this signalling message being denoted by RM(LR). Such a message is not necessary when the mobile router is connected to its home link or home subnetwork.

By way of non-limiting example, it is noted that in the abovementioned signalling message, the parameter LR denotes a location reference formed for example by an IP address allocated by site $S_x$ accommodating mobile router $MR_x$, i.e. the foreign site $S_x$, in particular by the administrator of the aforementioned foreign site $S_x$.

After the signalling message RM(LR) is transmitted, the method that is a subject of the invention involves, at the home site $S_1$, and after this signalling message is received, at a step B, discriminating the location of mobile router $MR_x$, in relation to its home site $S_1$, respectively to its home organisation $O_0$, based on the aforementioned signalling message, the discrimination being understood to mean the establishing of a location discrimination information item LI, as will be described later in the description.

The discrimination step is then followed by a step involving transmitting to mobile router $MR_x$ the abovementioned location discrimination information item LI, in order that mobile router $MR_x$ can use the discriminated location information.

The abovementioned step B is then followed, at mobile router $MR_x$, for any request by the mobile terminal for access to a group multicast communication to the home site $S_1$ and relating to a multicast communication local to the home site, respectively to the home organisation, of mobile router $MR_x$, the access request being denoted by AD(GR), GR actually indicating the address for group multicast communication in the home site, by substituting, at steps D, F, G and H as represented in FIG. 2a, for the access request AD(GR) a request for access to an extended multicast communication, when, on the one hand, the access request AD(GR) relates to a multicast communication local to the home site $S_1$, respectively to the home organisation $O_0$, of the mobile terminal and when, on the other hand, the location discrimination information item LI indicates a connection of mobile router $MR_x$ outside its home site $S_1$, respectively outside its home organisation $O_0$.

It is understood, in particular, that by virtue of the abovementioned substitution, any access request relating to a multicast communication local to the home site $S_1$, respectively to the home organisation $O_0$, of mobile router $MR_x$ is not accessible from a foreign site $S_x$ connecting the mobile router outside its home site, respectively outside its home organisation, but that, on the other hand, the request for access to an extended multicast communication allows access to the multicast communication local to the home site, respectively to the home organisation, of the mobile router in question.

The abovementioned substitution step is then followed by a step I involving transmitting to the home site the request for access to the extended multicast communication as will be described later in the description.

In particular, it is noted that the request for access to the extended multicast communication is denoted by $AR(GR_2)$, the abovementioned substitution operation involving, as will be described in more detail later in the description, substituting for the address GR in the request for access to a group multicast communication an address $GR_2$ for extended multicast communication enabling similar data to be broadcast.

The above step is followed by a step J involving receiving and transforming the extended multicast communication into a local transformed multicast communication at mobile router $MR_x$, the operations being symbolised by the relationship:

$$MF(GR_2)$$

$$MF(GR_2) \ominus TMF(GR).$$

Step J is followed by a step K involving transmitting the local transformed multicast communication TMF(GR) over the mobile IP network to the requesting user mobile terminal, the step being illustrated by the relationship $TMF(GR) \ominus T_x$ in FIG. 2a.

In a first implementation of the method that is a subject of the present invention, it is noted that the abovementioned substitution operation can be managed as represented in FIG. 2a.

After the access request step C processed by the mobile terminal T, denoted by Tx, only on the initiative of the user U, the substitution operation can involve carrying out a discrimination test D on the address GR in the request for access to a group multicast communication, the test of step D involving discriminating whether the aforementioned address GR is a global address GA, an organisation-local group address $GI_O$ or a site-local group address $GI_s$ local to the home site.

To implement the test of step D, it is noted that the value of the address GR in the request for access to a group multicast communication is simply discriminated by value with respect to a law for establishing values of global access addresses GA, and organisation-local group addresses $GI_O$, respectively site-local group addresses $GI_s$.

It is noted that the global addresses GA, organisation-local addresses $GI_O$, respectively site-local addresses $GI_s$, can, by way of non-limiting example, correspond to values of addresses assigned by the administrator of the home site $S_1$ in disjoint value ranges in order to perform a simple discrimination by comparison.

Upon a positive response relating to whether the address GR in the access request belongs to the set of global addresses GA, this positive response being indicated as "yes" in FIG. 2a, the request for access to a group multicast communication is then transmitted at a step E directly in the form of an access request denoted by AR(GR), the group multicast communication request being accessible by mobile router $MR_x$, and by mobile terminal $T_x$ independently of the location of its connection site $S_x$, due to the global nature of the multicast communication.

When the address GR in the group multicast communication request is not a global address, it corresponds either to an address for group multicast communication local to the home organisation $GI_0$ or local to the home site $GI_s$.

This scenario is represented symbolically at test D in FIG. 2a by the response "yes but" when the address GR is an address global to the home organisation $GI_0$ and by the response "no" when the address GR is, on the other hand, a site-global address $GI_s$. In the two aforementioned scenarios represented by "yes but" and "no" to the response to test D, knowledge of the location of the connection or more precisely of the site of mobile router $MR_x$ on the foreign site $S_x$ is then necessary.

Consequently, the responses "yes but" and "no" to test D are then followed by invoking a step F of the location information item LI which was transmitted to mobile router $MR_x$ at step B by the home site $S_1$.

Step F is then followed by a step G aiming to discriminate whether the address GR in the group multicast communication request belongs to the set of global addresses local to the home organisation when the mobile terminal is connected to a site that is different from the home site but belonging to the home organisation $O_0$, respectively whether the address GR in the group broadcast request belongs to the set of group addresses local to the home site and whether mobile router $MR_x$ is connected to the latter.

Consequently, through the test of step G, the following logic relationships are set up:

$$LI \in O_0 \text{ AND } GR \in GI_0;$$

$$LI \in S_1 \text{ AND } GR \in GI_s.$$

Upon a positive response to either one of the above logic relationships, the request for access to a group multicast communication AD(GR) is then set up in the form of a request for access to this same address GR in the form of request AR(GR) at step E in FIG. 2a.

However, upon a negative response to both logic relationships of the test of step G, a step H is invoked, in order to substitute for the address GR in the request for access to a group multicast communication, which cannot be received on the foreign site $S_x$ connecting mobile router $MR_x$, an address $GR_2$ that does provide for receiving at the aforementioned site $S_x$ the aforementioned group multicast communication.

Step H is then followed by a step I involving transmitting the access request $AR(GR_2)$ in which the address for group multicast communication has been replaced by an address $GR_2$ for extended multicast communication enabling of course access to the inaccessible local multicast communication from mobile router $MR_x$ connected to the foreign site $S_x$.

The method of operation of the substitution carried out at step H will be described later in the description.

Generally, it will be observed in FIG. 2a that the location reference LR, on the one hand, and the address GR in the group multicast communication request, on the other hand, are naturally independent variables left substantially to the judgement of the user U only, according to the movements of the mobile IP network and of the mobile router associated with the latter.

For this reason, it is of course conceivable to invert, if necessary, the sequence of steps D, F and G without departing from the scope of the subject of the present invention, the discrimination on whether the location reference LI belongs to the home organisation, respectively to the home site, able to be performed before the discrimination on the value of the group multicast communication request address GR, for example.

Such an inversion will not be described since it falls within the competence of a person skilled in the art.

Figure 2B:
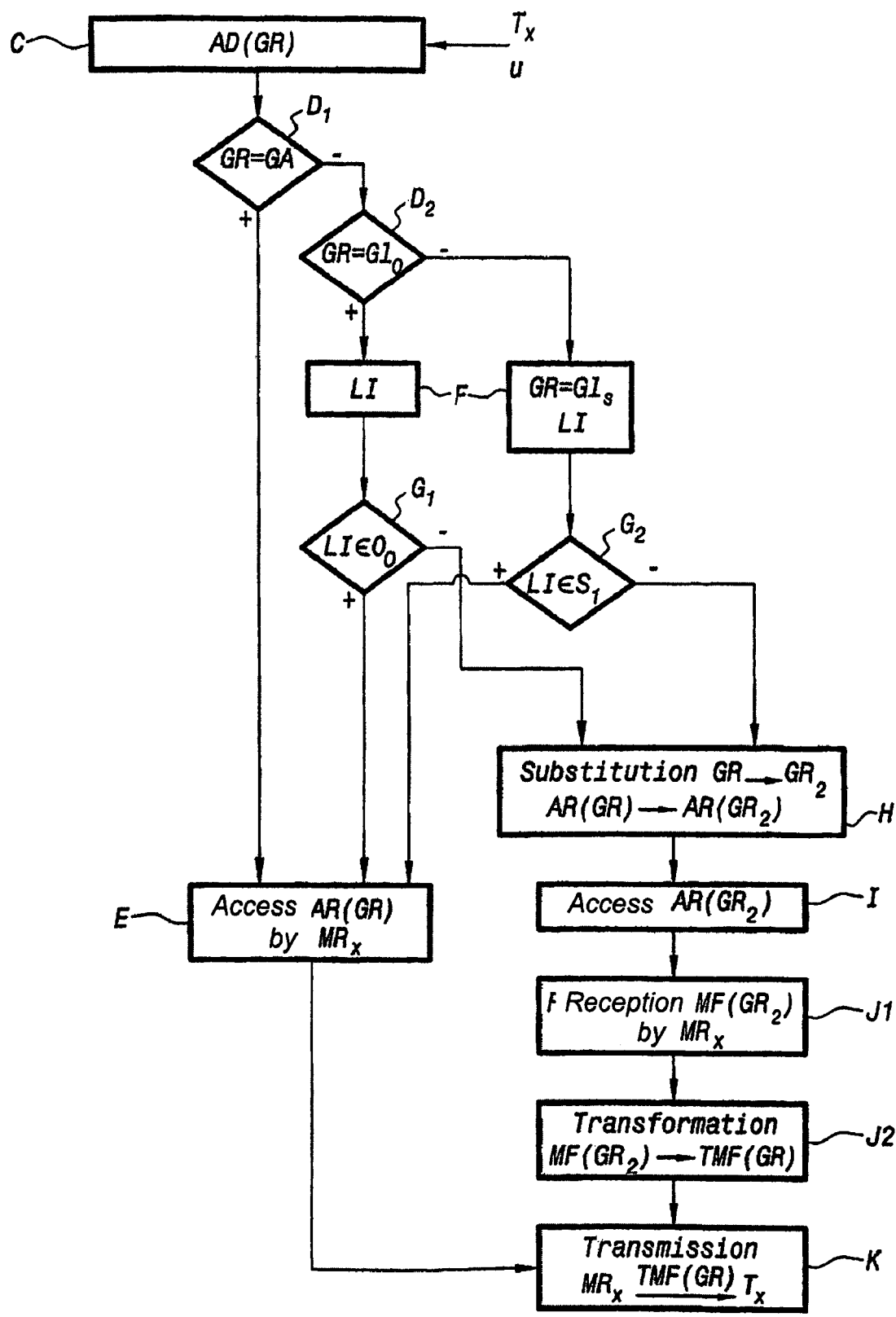

As regards implementing the logic steps represented at step D and G in FIG. 2a, these can be implemented as represented in FIG. 2b, step D actually being able to be subdivided into two successive tests $D_1$ and $D_2$ in which the group multicast communication address GR is then compared to the set of group global addresses GA at substep $D_1$, a negative response at the aforementioned substep allowing substep $D_2$ to be invoked for testing whether the group address GR belongs to the set of organisation-local group addresses $GI_0$. A positive response at substep $D_2$ has the effect of arriving at the scenario of the response "yes but" of step D in FIG. 2a and a negative response at substep $D_2$ has the effect of arriving at the scenario of the negative response "no" to the test of step D in FIG. 2a.

Step G in FIG. 2a can also be subdivided into two substeps $G_1$ and $G_2$, relating to whether the location reference LI belongs to the home organisation $O_0$, or to the home site $S_1$ respectively.

Steps E, F, H and I are then invoked in the same way as in the case of FIG. 2a.

A sui generis process for discriminating the connection site $S_x$ in relation to the home site and/or to the home multisite organisation of a mobile router $MR_x$ in accordance with the subject of the present invention will now be described in more detail with reference to FIGS. 3a, 3b and 3c.

Figure 3A:
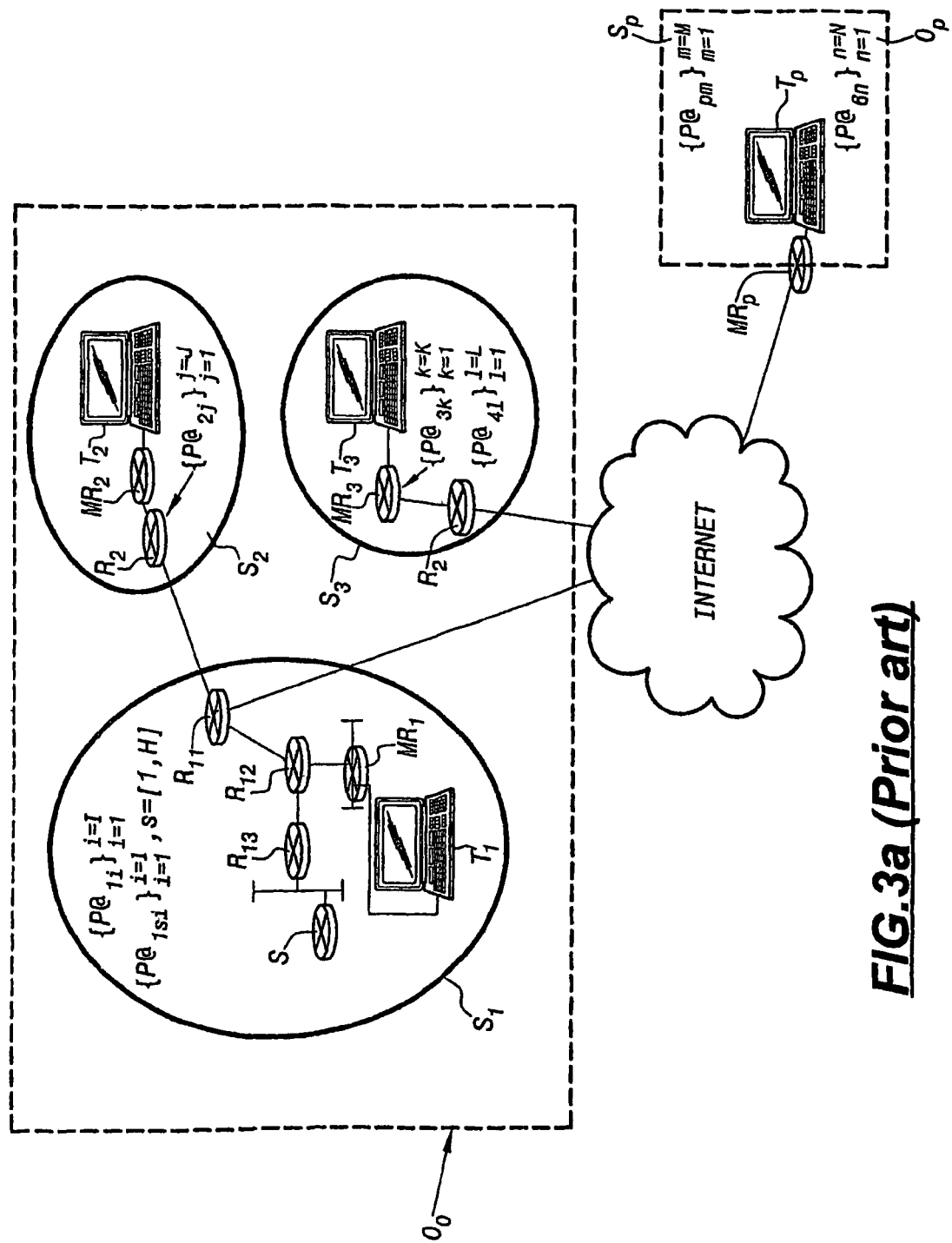
FIG. 3a represents a process, known in the prior art, for allocating permanent and temporary IP addresses to mobile routers associated with mobile networks of an enterprise.

FIG. 3a represents a home multisite organisation $O_0$ including for example three sites $S_1$, $S_2$ and $S_3$, site $S_1$ being the home site corresponding to a local area network, for example an IP network, including a plurality of routers $R_{11}$, $R_{12}$ and $R_{13}$ and a server S providing for managing the abovementioned home multisite organisation $O_0$.

Site $S_2$ is for example formed by a local IP subnetwork connected to the local area network forming the home attachment network of site $S_1$.

Lastly, site $S_3$ is a site belonging to the home multisite organisation $O_0$, site $S_3$ however being connected to the home attachment network and to site $S_1$ via the Internet network for example.

A mobile terminal $T_1$ belonging to a mobile network is thus capable of operating in its home attachment network, this terminal labelled $T_1$ being connected to the home site $S_1$ to which it is attached and connected via mobile router $MR_1$ to router $R_{12}$ for example and/or outside its home attachment network, this terminal then being denoted by $T_2$ when it is connected to the local subnetwork forming site $S_2$ via mobile router $MR_2$, connected to router $R_2$ of this local subnetwork.

The abovementioned mobile terminal can also be connected outside its home attachment network to site $S_3$ belonging to the home multisite organisation $O_0$ but via the Internet network, the abovementioned mobile terminal being denoted by $T_3$ in this situation and connected via mobile router $MR_3$.

Lastly, the abovementioned mobile terminal can be connected to a foreign site denoted by $S_p$ not belonging to the home multisite organisation $O_0$ but instead to a foreign multisite organisation, denoted by $O_p$, the abovementioned mobile terminal bearing the reference $T_p$ in this scenario, and being connected via mobile router $MR_p$.

It is naturally understood, by way of non-limiting example, that the abovementioned mobile router bearing the references $MR_1$, $MR_2$, $MR_3$ and $MR_p$ can be the same mobile router moving via the mobile network with which it is associated, or even any different mobile router and network capable of implementing the method that is a subject of the present invention.

As represented in FIG. 3a, there is allocated to mobile router $MR_1$ by the home attachment site and in the end by the home attachment network an internal permanent address denoted by $P@_{1i}$ for any networked connection of mobile router $MR_1$ to a site belonging to this home attachment network.

Likewise, an internal temporary address is allocated to the mobile router labelled $MR_2$ or $MR_3$ for any networked connection of the abovementioned mobile router to another site belonging to the home multisite organisation $O_0$. It is understood, in particular, that the administrator of the IP network forming the home multisite organisation $O_0$ and in the end the administrator of sites $S_1$, $S_2$ and $S_3$ is then in a position to allocate, when the mobile router at position $MR_2$ is connected to site $S_2$, an internal temporary address denoted by $P@_{2j}$ or instead, an internal temporary address denoted by $P@_{3k}$ or $P@_{4l}$, when the mobile router at position $MR_3$ is connected to site $S_3$. It is noted in particular that the difference between the internal temporary addresses $P@_{3k}$ or $P@_{4l}$ corresponds to a temporary address called a mobility address, and substantially arbitrary, allocated by the server centre S, and to a translation address respectively, for example.

It is recalled, in particular, that, in the case of an enterprise, the administrator has a set of IP addresses, referred to as private addresses, which can be used freely; any administrator of another IP network can also freely reuse these same IP addresses (document RFC 1918 of the IETF). Furthermore, when this enterprise wishes to communicate over the Internet, it must then use globally unique IP addresses that are unique in the world and therefore regardless of the network connected to the Internet. Globally unique addresses are called public addresses and are assigned either by the Internet access provider or by a regional RIR (Regional Internet Registry). Most often, enterprises use equipment between their network and the Internet which translates the private addresses into public addresses. In the method that is a subject of the invention, the IP address assigned to mobile router $MR_x$ can be private and the datagrams used to reach server S can nevertheless pass through an address translator when passing through the Internet and therefore appear to come from a public address. Such a public address can, for example, be possessed by site $S_3$ in FIG. 3a or any other site.

Lastly, when the mobile router is connected to a foreign site, such as site $S_p$, which does not belong to the home multisite organisation but to another multisite organisation $O_p$, then the address allocated to mobile router $MR_p$ at the position in FIG. 3a is denoted by $P@_{pm}$ and forms an external temporary address. $P@_{pm}$ denotes a private address and $P@_{6n}$ denotes a public address used as the address-translation of the abovementioned private address $P@_{pm}$.

Under these conditions, it is understood that the notion of internal permanent and temporary address corresponds to the internal nature of the allocated addresses in relation to the home multisite organisation $O_0$, while the external nature of the temporary address, when the mobile terminal is connected to a site not belonging to the home multisite organisation, corresponds to the external nature of this address in relation to the aforementioned home multisite organisation.

It is naturally understood that, a priori, only the internal address are known to the home multisite organisation $O_0$, while the external addresses are not known to the latter.

Consequently and in accordance with one aspect of the method that is a subject of the present invention, it is considered that the abovementioned internal and/or external addresses form, for the mobile terminal, a location reference with respect to the home multisite organisation $O_0$.

Thus, by way of non-limiting example:

$$\{P@_{1si}\}_{i=1, s=1 \text{ à } H,}^{i=I}$$

denotes the set of internal permanent addresses of one of the subnetworks allocated to the set of mobile routers attached to the home attachment network supporting the home site $S_1$. This set is the set of internal permanent addresses of the home link or home subnetwork and the set $\{P@_{1i}\}$ therefore makes reference to the set of addresses of the home site $S_1$, all the subnetworks being merged;

$$-\{P@_{2j}\}_{j=1}^{j=J}, \{P@_{3k}\}_{k=1}^{k=K}, \{P@_{4l}\}_{l=1}^{l=L}$$

denotes the set of internal temporary addresses allocated to the set of the abovementioned mobile routers for any connection of one of these mobile routers to another site belonging to the home multisite organisation $O_0$;

$$-\{P@_{pm}\}_{m=1}^{m=M}$$

denotes the set of external temporary addresses allocated by a multisite organisation $O_p$ that is separate from the home multisite organisation and for any site $S_p$ belonging to this separate multisite organisation;

$$-\{P@_{6n}\}_{n=1}^{n=N}$$

denotes the set of public addresses used by the translation of the private addresses $P@_{pm}$.

Figure 3B:
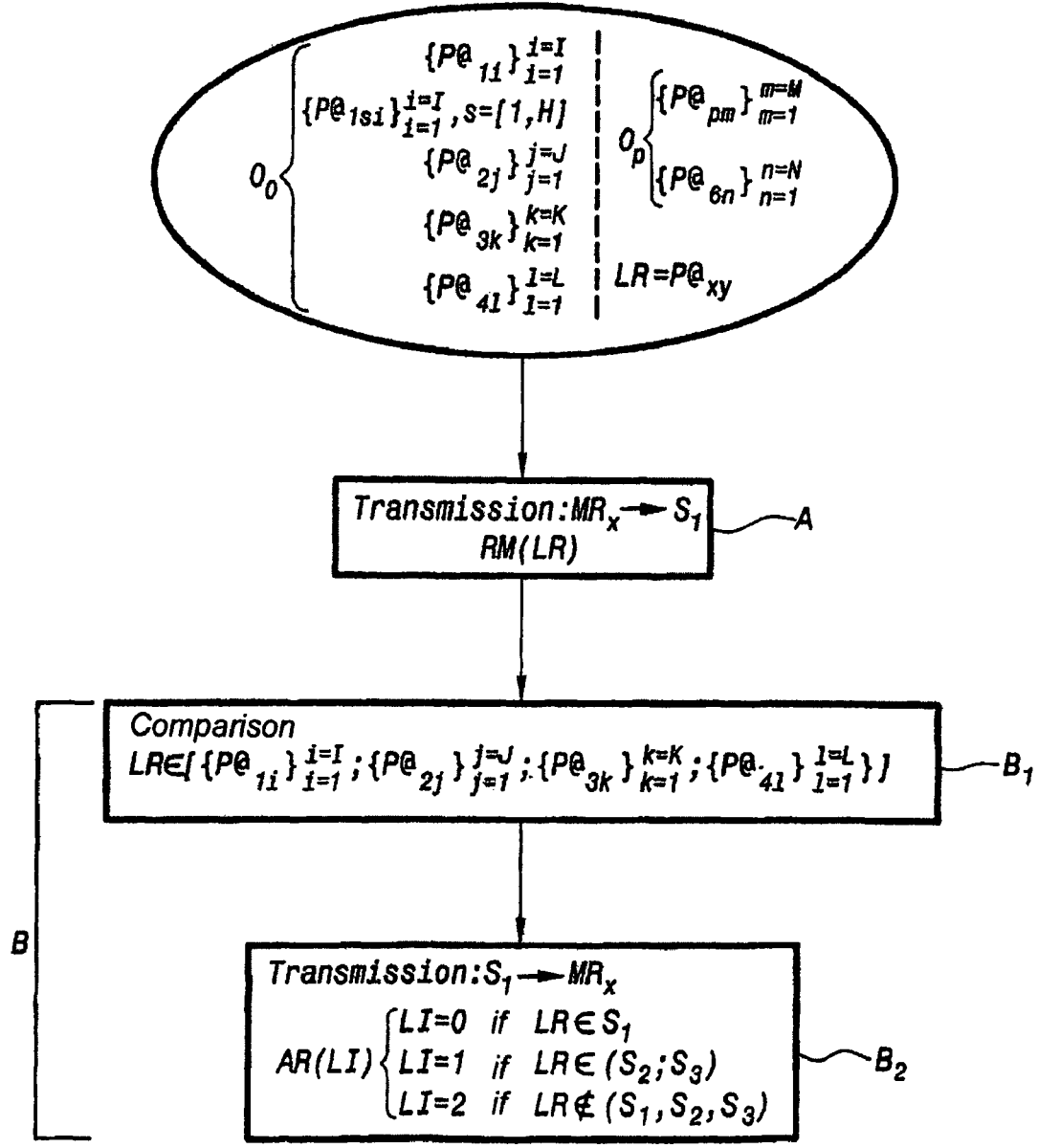
FIG. 3b represents, by way of illustration, a flow chart of the implementation of a process for locating the connection of a mobile router associated with a mobile IP network, enabling the method that is a subject of the present invention to be implemented.

With reference to FIG. 3b, for any connection of the abovementioned networked mobile router to a determined site, the sui generis location process that is a subject of the invention involves at a step A transmitting from mobile terminal $T_1$, $T_2$, $T_3$ or $T_p$ to the home attachment network and in the end to site $S_1$ belonging to the home multisite organisation $O_0$, a registration message including at least the location reference mentioned previously.

In FIG. 3b, the registration message is denoted by:

RM(LR)

where LR denotes the abovementioned location reference. It is recalled that the location reference is formed by one of the addresses allocated to the abovementioned moving mobile router according to the scenarios represented in FIG. 3a.

The signalling message can be used to register the connection of the abovementioned mobile router.

In particular, in an advantageous and non-limiting manner, it is noted that the location reference LR can be a coded value, a function of the allocated address. In that case, this coded value can be obtained at the mobile router, from a specific bit-by-bit XOR coding function or other on the permanent address with a configuration key, the reciprocal coding function and the configuration key, known to only server S of the home site $S_1$, providing for restoring the permanent address. The coding function and the reciprocal decoding identity function are used for example to transmit only the permanent home address. To this end, the mobile router can carry out a test, being able to compare the result of the coding of the location reference LR, by means of the coding function f, denoted by f(LR), and the result of this same coding function applied to the permanent home address $\{P@_{1si}\}$. The mobile terminal knows only that $f(\{P@_{1si}\})$ calculates f(LR) in order to be able to perform this comparison. This comparison enables the mobile router to detect whether or not it is connected at its home link on its home site $S_1$. Server S must decode the value resulting from the coding $RP@_{1si} = f\{P@_{1si}\}$ in order to find the true set $\{P@_{1si}\}_{i=1}^{i=I}$, where s is fixed. Only server S knows the inverse function $f^i$, which applied to the coded value of the permanent address $f^i(f\{P@_{1si}\}) = \{P@_{1si}\}$ restores the latter. Server S can then compare the location reference value LR with $\{P@_{1si}\}_{i=1}^{i=I}$, where s=1 to H, in order to check whether the terminal is on its home site.

Step A is then followed by a step $B_1$ involving comparing for identification purposes the location reference LR with the values of addresses of one at least of the abovementioned sets formed by the set of internal permanent addresses allocated to the set of mobile routers attached to the home attachment network and by the set of internal temporary addresses allocated to this mobile router set for any connection to another site belonging to the home multisite organisation $O_0$.

In FIG. 3b, the comparison operation is symbolised by the relationship:

$$LR \in [\{P@_{1i}\}_{i=1}^{i=I}; \{P@_{2j}\}_{k=1}^{k=K}; \{P@_{3k}\}_{k=1}^{k=K}; \{P@_{4l}\}_{l=1}^{l=L}]$$

Comparison step $B_1$ is then followed by a step $B_2$ involving transmitting from the home attachment site $S_1$ to the mobile router, according to the position of the latter, a signalling response or acknowledgement message containing at least one location discrimination information item for the abovementioned mobile router.

At step $B_2$, the registration acknowledgement message is denoted by:

AR(LI).

For the abovementioned message, LI denotes the location discrimination information item transmitted to the mobile router.

According to one notable aspect of the method that is a subject of the invention, the location discrimination information item LI denotes:

either the connection of the mobile router to its home attachment network, i.e. to its site $S_1$, when the location reference LR is identified in the set of internal permanent addresses;

or the connection of the networked mobile router to another site belonging to the home multisite organisation when the location reference LR is identified in the set of internal temporary addresses mentioned above;

or the connection of the networked mobile router to a foreign site not belonging to the home multisite organisation, when the location reference LR is not identified in both the set of internal permanent addresses and the set of internal temporary addresses.

In FIG. 3b, at the abovementioned step $B_2$, the content of the location discrimination information item is represented by the relationships:

LI=0 if LR ∈ $S_1$;

LI=1 if LR ∈ ($S_2$; $S_3$);

LI=2 if LR ∈($S_1$, $S_2$, $S_3$).

In the above relationship, it is noted that the relationships regarding the membership of sites $S_1$, $S_2$ and $S_3$ are represented symbolically but executed by checking whether the location reference belongs to the set of addresses associated with each of the aforementioned sites as mentioned previously in the description.

It is also understood that the non-membership of the location reference LR is also obtained by checking that the location reference LR is not identified in all sets of addresses associated with each of sites $S_1$, $S_2$ and $S_3$ belonging to the home multisite organisation.

Of course, in the symbolic relationship given for step $B_2$ in FIG. 3b, the values 0, 1 and 2 of the location information item LI are completely arbitrary.

Lastly, at step $B_2$ in FIG. 3b, $MR_x$ actually denotes the mobile router in the position $MR_1$, $MR_2$, $MR_3$ or $MR_p$.

More specifically, it is noted that the set of internal permanent addresses $\{P@_{1i}\}_{i=1}^{i=I}$ and the set of internal temporary addresses $\{P@_{2j}\}_{j=1}^{j=J}$, $\{P@_{3k}\}_{k=1}^{k=K}$ and $\{P@_{4l}\}_{l=1}^{l=L}$ are formed advantageously by disjoint sets of values of addresses allocated by the home attachment network to the mobile router which requests them when it is networked to one of the sites belonging to the home multisite organisation. This operation is of course carried out under the control of server S and of the network administrator responsible for the latter.

However, since the sets $\{P@_{1i}\}_{i=1}^{i=I}$, $\{P@_{2j}\}_{j=1}^{j=J}$ and $\{P@_{4l}\}_{l=1}^{l=L}$ are formed by disjoints sets of values of addresses, the set $\{P@_{3k}\}_{k=1}^{k=K}$ can be a non-disjoint set, covering the sets $\{P@_{1i}\}_{i=1}^{i=I}$ and $\{P@_{2j}\}_{j=1}^{j=J}$ since the addresses of the set $\{P@_{3k}\}_{k=1}^{k=K}$ can be translated into addresses $\{P@_{4l}\}_{l=1}^{l=L}$.

It is also noted that the set of internal temporary addresses is formed either by predetermined address values, i.e. by the subset $\{P@_{2j}\}_{j=1}^{j=J}$ and $\{P@_{3k}\}_{k=1}^{k=K}$, these predetermined address values naturally able to be arbitrary but contained in a range of specific addresses as determined by the network administrator, or by address values calculated by translation. For example the values of the subset $\{P@_{4l}\}_{l=1}^{l=L}$ are calculated based on values of addresses forming internal permanent addresses mentioned above by and under the authority of the home attachment network and of the network administrator.

As regards the external temporary address allocated to the mobile router at position $MR_p$ in FIG. 3a, for any networked connection to a foreign site $S_p$ not belonging to the home multisite organisation, it is noted that such a temporary address can for example be formed by an address value calculated by translation based on the permanent address allocated to the mobile router by the separate multisite organisation $O_p$ under the authority of the administrator of the latter, but translated into an IP address that is unique on the Internet, before reaching server S in the home multisite organisation $O_0$, between the multisite organisation $O_p$ and the Internet.

Figure 3C:
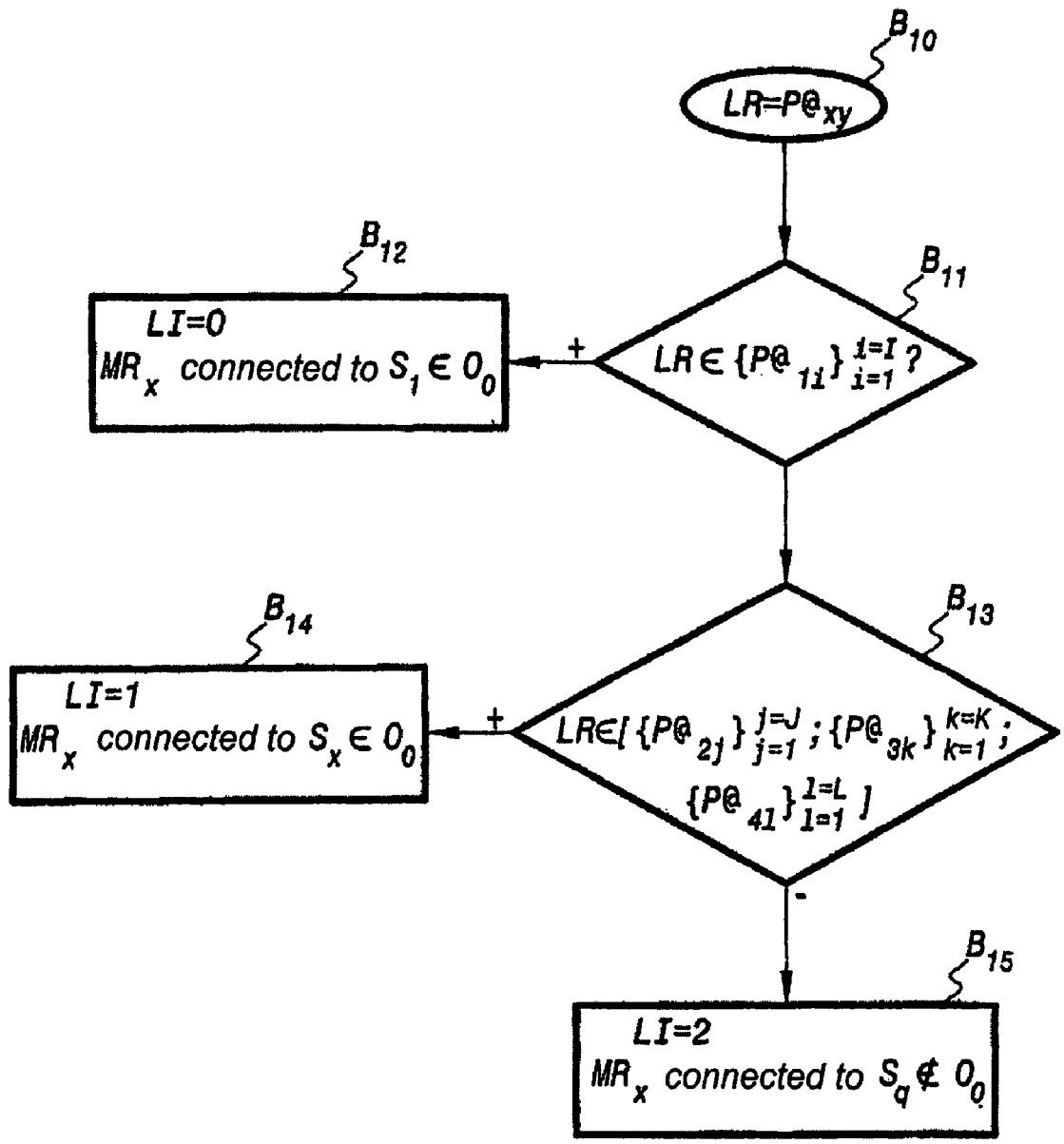
FIG. 3c represents, by way of illustration, a detailed flow chart of the implementation of the comparison step executed by the location process illustrated in FIG. 3b.

As regards a specific implementation of the comparison step $B_1$ in FIG. 3b, it is noted by way of non-limiting example that such an implementation can involve a sequence of steps as represented in FIG. 3c.

In FIG. 3b and FIG. 3c, the location reference LR is denoted by $LR=P@_{xy}$ where x denotes the scenario reference of the mobile router and y an allocated address in this scenario.

By way of non-limiting example, the abovementioned steps can then comprise, in the context of the implementation of step $B_1$, a step $B_{11}$ regarding whether the location reference belongs to the set of internal permanent addresses, a positive response to this test $B_{11}$ leading to conclude, at a step $B_{12}$, that the value of the location discrimination information item LI is 0, mobile router $MR_x$ then being connected to the home site $S_1$ belonging to the home multisite organisation $O_0$.

However, upon a negative response to test $B_{11}$, a new test $B_{13}$ is invoked for comparing the location reference LR with the set of internal temporary addresses as mentioned previously in the description.

Upon a positive response to test $B_{13}$, the value LI=1 is allocated to the location information item LI, mobile router $MR_x$ therefore being connected to a site $S_x$ separate from the home site $S_1$ but belonging to the home multisite organisation $O_0$.

However, upon a negative response to test $B_{13}$, the value 2 is then assigned to the location information item LI, mobile router $MR_x$ being connected to a foreign site $S_p$ not belonging to the home multisite organisation $O_0$.

More specifically and in a non-limiting manner, it is noted that step B for discriminating the connection position value LI and then transmitting this connection position value via the acknowledgement message AR (LI) in FIG. 2*b* can be replaced at mobile router $MR_x$ by a step involving the execution of a procedure for locating the connection of this mobile router in order to generate the location variable LI.

This alternative implementation can be implemented for large mobile networks, such as those of a train or railway vehicle. The databases for permanent and temporary addresses of mobile routers needed to execute steps $B_1$ and $B_2$ in FIGS. 3*b* and 3*c* must be available at mobile router $MR_x$.

The sui generis process of extended multicast information communication, based on a local multicast information communication on a home site to at least one user mobile terminal belonging to this home site, to at least one separate site hosting this mobile workstation and linked to this home site via the IP network, through a mobile router, in accordance with the subject of the present invention, will now be described with reference to FIGS. 4*a* and 4*b*.

In general, it is recalled that the local multicast information communication denoted by $LMD_{1i}$ is generated by an information broadcast source SD dedicated to a first address for local multicast information communication in this home site $S_1$.

Figure 4A:
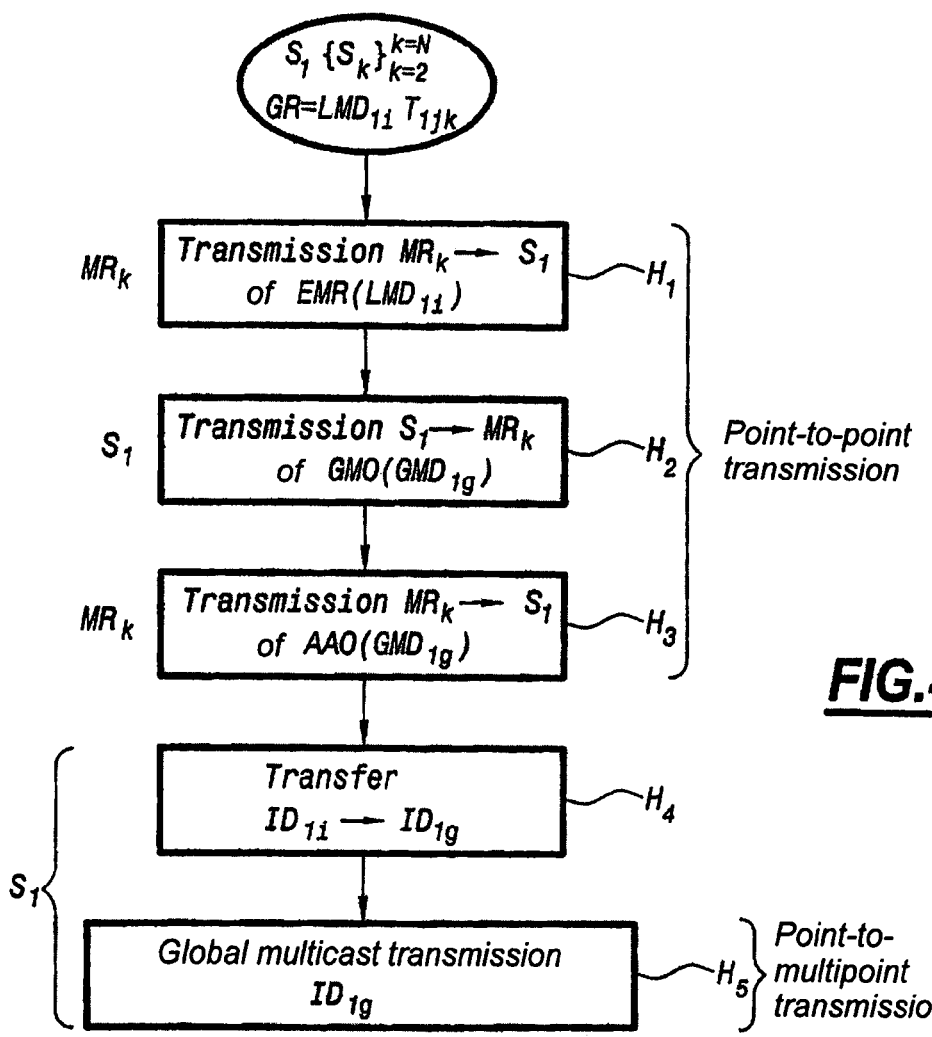
FIG. 4a represents, by way of illustration, a sui generis process of extended multicast transmission enabling the method that is a subject of the present invention to be implemented.

With reference to FIG. 4*a*, the local multicast information communication is denoted by $LMD_{1i}$ where the address references 1 and i represent the first address for local multicast information communication in this home site, the reference 1 denoting the address of the home site $S_1$ and the reference i denoting the address for the local multicast information communication in question in the aforementioned home site. The local multicast information communication can be likened to the first broadcast address $GR_1$ described previously in the present description.

There is also considered a set of separate sites $\{S_k\}$, k=2 to k=N, the home site $S_1$ and each of sites $S_k$ forming the entity or multisite enterprise mentioned previously in the description.

Lastly, a mobile terminal is considered denoted by $T_{1jk}$, the index 1 indicating a reference relating to this mobile terminal belonging to the home site $S_1$, the reference j denoting a reference or code identifying the mobile terminal in question, the reference k denoting the connection of mobile router $MR_k$ in question to the separate site $S_k$ hosting the latter and the link of the mobile terminal in question to the home site via mobile router $MR_k$ and via the IP network.

With reference to FIG. 4*a*, the sui generis process for extended multicast information communication, that is a subject of the invention, involves via the interconnection of the mobile terminal and of mobile router $MR_k$ to the IP network, transmitting, at a step $H_1$, from mobile router $MR_k$ to the home site $S_1$, an extended multicast information communication request message, this request message being denoted by EMR $(LMD_{1i})$.

As indicated at step $H_1$ in FIG. 4*a*, the abovementioned request message contains at least the first address $LMD_{1i}$, for local multicast information communication forming the group multicast communication address GR, and a code identifying mobile router $MR_k$ based in particular on the indexes 1 and references j and k of the mobile workstation in question $T_{1jk}$.

After the home site $S_1$ has identified mobile router $MR_k$ based on the information contained in the request message, the extended multicast information communication process involves, at a step $H_2$, transmitting from the home site $S_1$ to mobile router $MR_k$ a message offering access to a global multicast information communication, this access offer message GMO($GMD_{1g}$) being denoted by GMO($GMD_{1g}$) in FIG. 4*a*. The abovementioned access offer message contains at least a second address for global multicast information communication $GMD_{1g}$, i.e. the substitution address $GR_2$, the broadcast source of which is identified in the home site.

With reference to FIG. 4*a* and step $H_2$ therein, it is understood that the second address for global multicast information communication $GMD_{1g}$ includes the reference at the index 1 relating to the home site and the reference g relating to a global multicast communication address as defined in a specific way according to the standard RFC 2365 mentioned previously in the description.

After mobile router $MR_k$ receives the access offer message GMO($GMD_{1g}$), the extended multicast information communication process then involves at a step $H_3$ transmitting from the aforementioned mobile router $MR_k$ to the home site $S_1$ via the IP network an access offer acceptance message for access to the information being broadcast to the second address for global multicast information communication.

At step $H_3$ in FIG. 4*a*, the access offer acceptance message is denoted by AAO($GMD_{1G}$).

After the access offer acceptance message AAO($GMD_{1G}$) is received at the home site $S_1$, the extended multicast information communication process comprises a step $H_4$ involving transferring information to be broadcast, which information is stored at the first broadcast address and denoted for this reason by $ID_{1i}$, to the second broadcast address. The information is stored under the second broadcast address denoted by $ID_{1g}$.

By this simple operation, the information broadcast according to a local multicast information communication on the home site $S_1$ can then be broadcast according to an extended multicast information communication via the next step $H_5$ represented in FIG. 4*a*.

The abovementioned step $H_5$ then involves transmitting by global multicast communication the information to be broadcast under the second address $ID_{1g}$. This enables mobile router $MR_k$ interconnected to the separate site $S_k$ to receive on the aforementioned separate site information being broadcast under the first local broadcast address then broadcast under the second global broadcast address.

With reference to the same FIG. 4*a*, it is noted that steps $H_1$, $H_2$ and $H_3$ represented in this drawing, relating to the transmission, between mobile router $MR_k$ and the home site $S_1$, of the extended IP multicast communication request message EMR ($LMD_{1i}$), of the access offer message for access to a global multicast communication GMO ($GMD_{1g}$) and of the access offer acceptance message AAO ($GMD_{1G}$), are executed in point-to-point mode.

Execution of this mode of transmission for the abovementioned steps is made possible by virtue of the communication of the respective addresses 1 of the home site, respectively k of the separate site $S_k$ in question, the index j or address reference of the mobile workstation able to then consist of a code identifying the latter, and of the mobile router identified by the abovementioned indexes k and j.

However and according to a notable aspect of the method that is a subject of the present invention, the global multicast transmission step $H_5$ is carried out in point-to-multipoint mode.

Figure 1A:
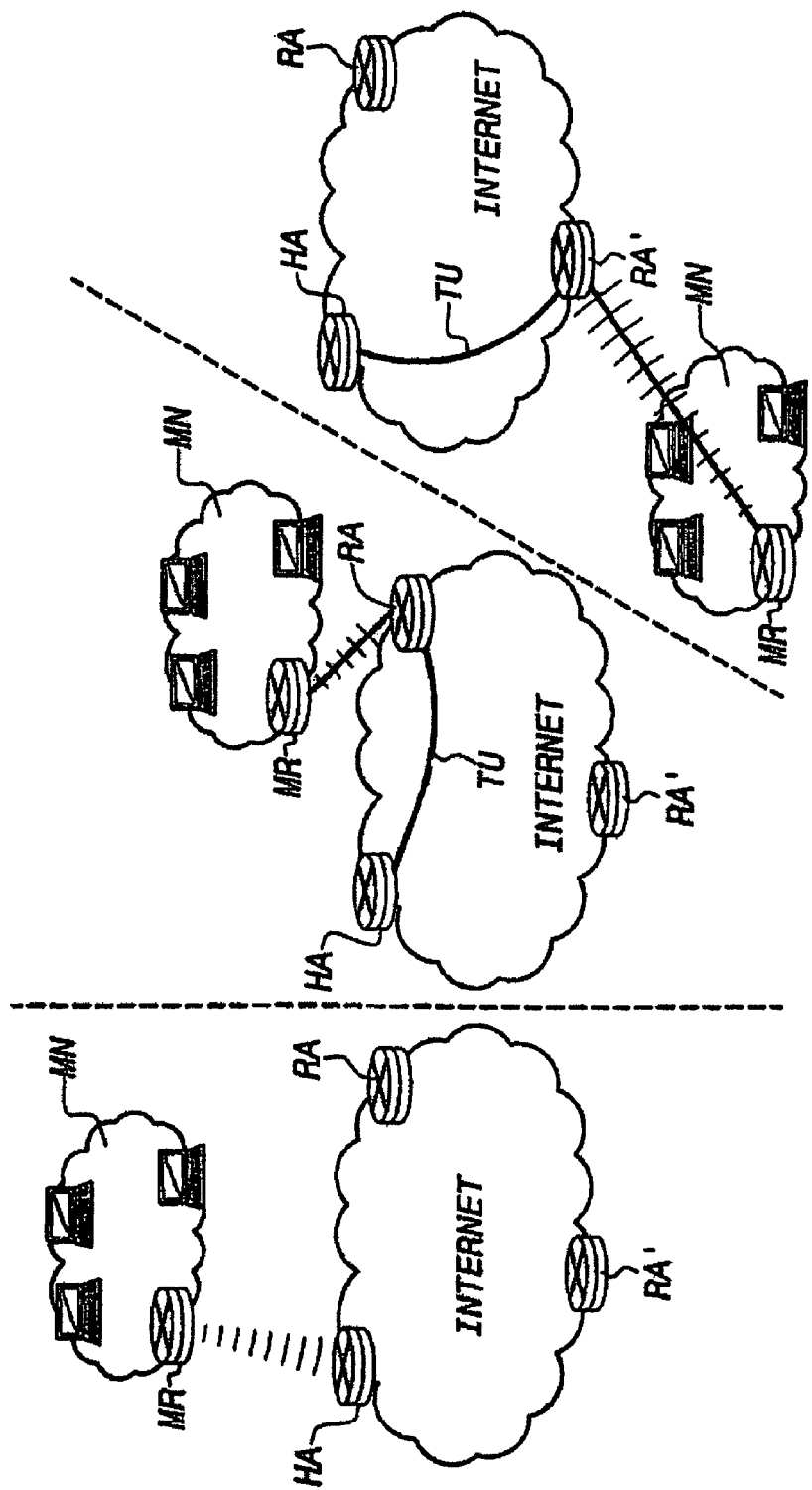
Figure 1B:
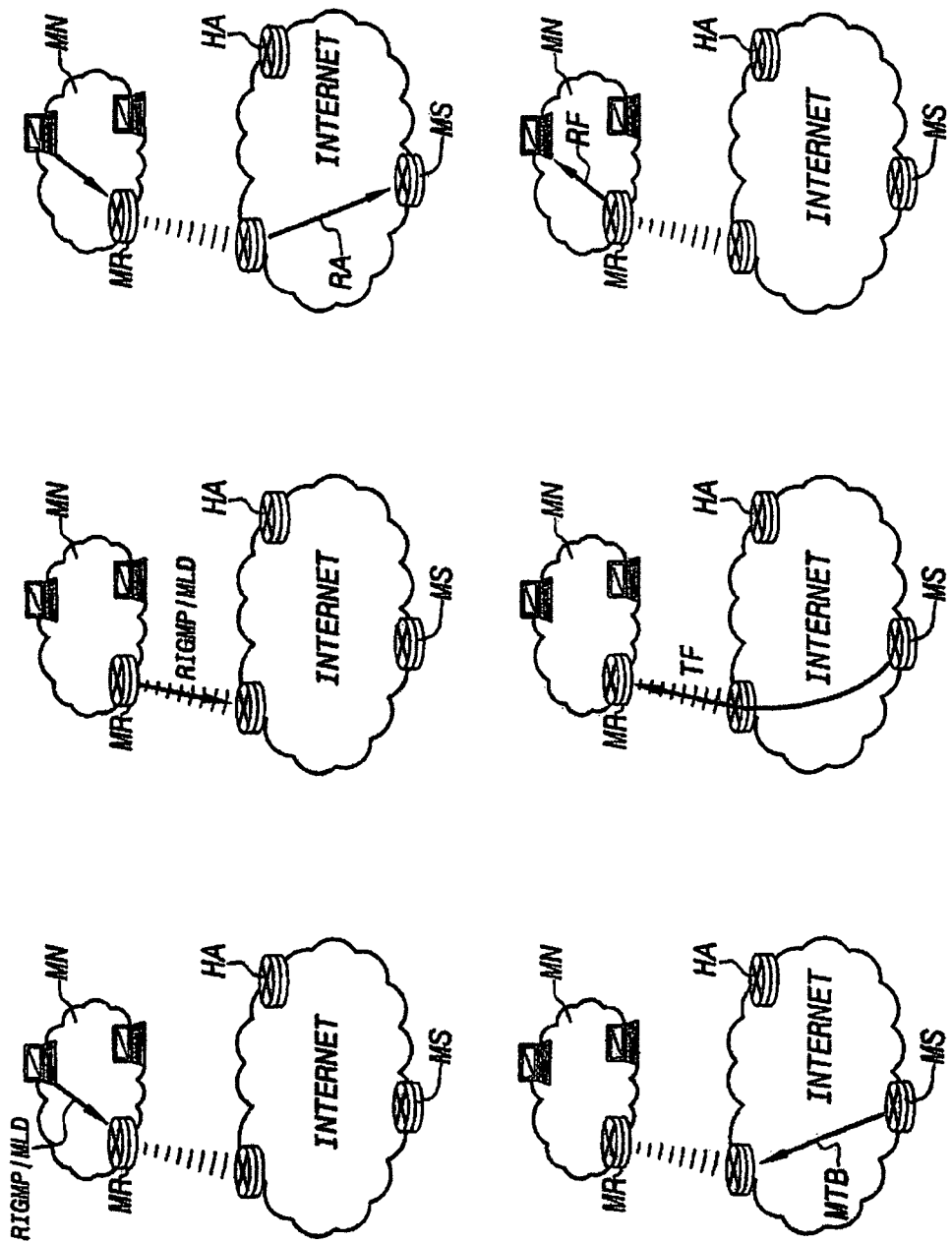

Under these conditions, it is understood that the process for transmitting information broadcast under the second address, the global multicast transmission at step $H_5$, is then comparable to that described with reference to FIG. 1*a* described previously in the description, but that the transmission of information broadcast under the second address for global multicast communication $ID_{1g}$ is no longer carried out locally to the home site only but also to the separate site or sites of the multisite entity.

A particular implementation of step $H_4$ involving transferring the information to be broadcast from the first to the second broadcast address will now be described with reference to FIG. 4b.

The abovementioned implementation relates to the particular non-limiting case in which the home site $S_1$ comprises a broadcast server SD connected to the IP network via a router denoted by $R_{11}$ for example. This particular case corresponds advantageously to the scenario of a multisite enterprise for which one of the home sites $S_1$ is equipped with a broadcast server SD having a large number of clients, the use of a router in this scenario being preferred.

Figure 4B:
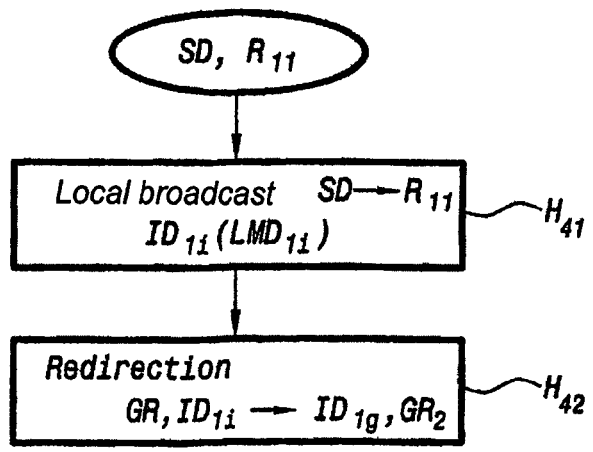
FIG. 4b represents, by way of illustration, a detail in the implementation of a process for transforming a multicast communication local to a site into a global multicast communication or into a broadcast local to the home organisation of a mobile router.

With reference to FIG. 4b, it is indicated that the abovementioned step $H_4$ can then include a step $H_{41}$ of local multicast communication of information to be broadcast, which information is stored at the first address $LMD_{1i}$, from the broadcast server to the router $R_{11}$.

The abovementioned step $H_{41}$ is followed by a step $H_{42}$ involving a step for redirecting information to be broadcast $ID_{1i}$ by substituting the second address for global multicast communication $GMD_{1g}$ or $GR_2$ for the first address for local broadcast $LMD_{1i}$ forming the address for group multicast communication GR. It is understood in particular that this redirection step $H_{42}$ can simply involve allocating to the locally broadcast information $ID_{1i}$ the second address for global multicast communication to actually generate the data stored at the second broadcast address, that data denoted by $ID_{1g}$.

It is understood in particular that the abovementioned redirection step can simply involve associating with the stored data supporting the information to be broadcast, the data being stored at router $R_{11}$, a simple data structure including the first and the second address, the data structure able simply to be a list containing at least the abovementioned first and second address, or any equivalent data structure.

Given the method of operation of the extended multicast communication process as described in FIGS. 4a and 4b, it is noted that, for a plurality of extended multicast communication request messages, relating to the same first address for local multicast communication, emanating from a plurality of mobile routers belonging to the home site and each interconnected to the IP network on a different separate site, step $H_5$ involving transmitting by global multicast communication the information to be broadcast under the second address then enables a global multicast tree to be created, the root item of which is formed by one of the routers common to the broadcast branches that make up the aforementioned global multicast tree.

However, a specific implementation of the extended multicast communication process can be envisaged, this implementation appearing particularly advantageous for providing a consistent management of types of local, respectively global, multicast information communication and of the memory space occupied in the end for this purpose, both at broadcast server SD and at router $R_{11}$.

According to the particularly advantageous implementation mentioned above, the second address for global multicast communication $GMD_{1g}$ can be maintained and validated for a local multicast information communication $LMD_{1i}$ to the first address permanently. The notion of permanent information communication is understood to mean maintaining the global address as long as there are mobile routers connected outside.

Under these conditions, it is understood that in order to maintain and permanently validate the second address for global multicast information communication $GMD_{1g}$, the data structure, such as a list [$LMD_{1i}$, $GM_{1g}$], is stored and secured permanently at the router, the first and second addresses thus being placed permanently under one-to-one mapping.

Under these conditions, step $H_4$ involving transferring information to be broadcast from the first to the second broadcast address can then be suppressed for any extended multicast communication request message to this second address, after the first extended IP multicast communication request message to the second address mentioned above.

It is understood in particular that the notion of suppression in step $H_4$ simply concerns the suppression of the physical transfer of data stored at the first address to the second address, this physical transfer then able to be simply replaced by invoking the second address for global multicast information communication from the structure of permanent data mentioned previously.

For a more detailed description of the sui generis process for discriminating the connection site in relation to the home site and/or to the home multisite organisation, respectively of the sui generis extended global multicast communication process, it may be useful to refer to French patent applications FR 03 09873 and FR 03 12688 filed previously on Aug. 12, 2003 and Oct. 29, 2003 respectively in the name of the applicant.

A more detailed description of a dedicated mobile router in accordance with the subject of the present invention, the router being equipped with functions for controlling and transmitting access requests by any user mobile terminal connected to a mobile IP network managed by the latter and enabling the method that is a subject of the present invention to be implemented will now be given with reference to FIG. 5.

Conventionally, the mobile router that is a subject of the invention is equipped with functions for controlling and transmitting access requests, as mentioned above, and naturally has resources for processing conventional data such as a central processing unit CPU, input/output devices I/O for transmitting and receiving IP type messages, and software modules for implementing the various functions as described previously in the description with reference to FIGS. 2a to 4c.

As represented in FIG. 5, mobile router $MR_x$ includes at least one module $M_1$ for discriminating the type of multicast communication requested by any request for access to a multicast communication transmitted by a requesting user mobile terminal $T_x$. The abovementioned software module $M_1$ provides for implementing the method that is a subject of the present invention, in particular the steps of the sui generis location process as described previously in the description with reference to FIGS. 2a, 2b onwards.

The abovementioned mobile router also includes a module $M_2$ for substituting, according to a location variable of the connection of the mobile router outside its home site or outside its home organisation, for any request for access to a group multicast communication to the home site and relating to a multicast communication local to the home site, respectively to the home organisation, of the mobile terminal, a request for access to an extended multicast communication providing access to the local multicast communication. Module $M_2$ is a software module for actually executing steps D to H in FIG. 2a for example.

It also includes a software module denoted by $M_3$ for transforming the extended multicast communication received from the home site of mobile router $MR_x$ into a local transformed multicast communication TMF (GR) at which there is substituted a local transformed multicast communication source address, the abovementioned address GR. Software module $M_3$ actually provides for executing steps J and K represented in FIG. 2a onwards.

It is understood in particular that the transformation by software module $M_3$ can advantageously be executed by preserving global multicast stream data items received and by substituting for the global multicast communication source address, forming the extended multicast communication process, a local transformed multicast communication source address, i.e. the address GR at step J in FIG. 2a.

Furthermore, the dedicated mobile router $MR_x$ that is a subject of the present invention naturally comprises, through the input/output devices I/O, IP message transmission and reception resources. The reception resources provide, as represented in FIG. 5, at least for receiving the location information of the access offer message, message AR (LI), and for receiving the extended multicast communication by step I in FIG. 2a, then step J1 in FIG. 2b.

The input/output devices (I/O) also provide at least for transmitting the extended multicast information communication request message, the message $EMR(LMD_{1i})$, and the access offer acceptance message AAO ($GMD_{1g}$).

Lastly, the abovementioned transmission resources naturally provide for transmitting the local transformed multicast communication stream over the mobile IP network to at least the requesting user mobile terminal $T_x$ at step K in FIG. 2a, as represented in FIG. 5.

A more detailed description of the process for setting up a multicast communication tree corresponding to the extended multicast communication over the site interconnection network upon request by various connected mobile networks will now be given with reference to FIGS. 6a to 6c.

In addition to the specific configuration of mobile router $MR_x$ as represented in FIG. 5, it is recalled that the latter explicitly has the address of the machine containing the new software agent on its home site, and in particular of the access router on the home site. It is understood in particular that to transmit the local transformed multicast communication stream over the mobile IP network to at least the requesting user mobile terminal $T_x$, as described previously with reference to FIG. 5 in particular, mobile router $MR_x$ is equipped with a software agent which provides for modifying the multicast packets, and thus transmitting them over the mobile network or networks in question as a local multicast communication in the appropriate format.

More specifically, it is recalled that in order to access or subscribe to a broadcast local to its home site, any mobile router $MR_x$ transmits no longer a conventional MLD or IGMP subscription request to its access router, but instead a request or message such as the message EMR ($LMD_{1i}$) represented in FIG. 5.

Figure 6A:
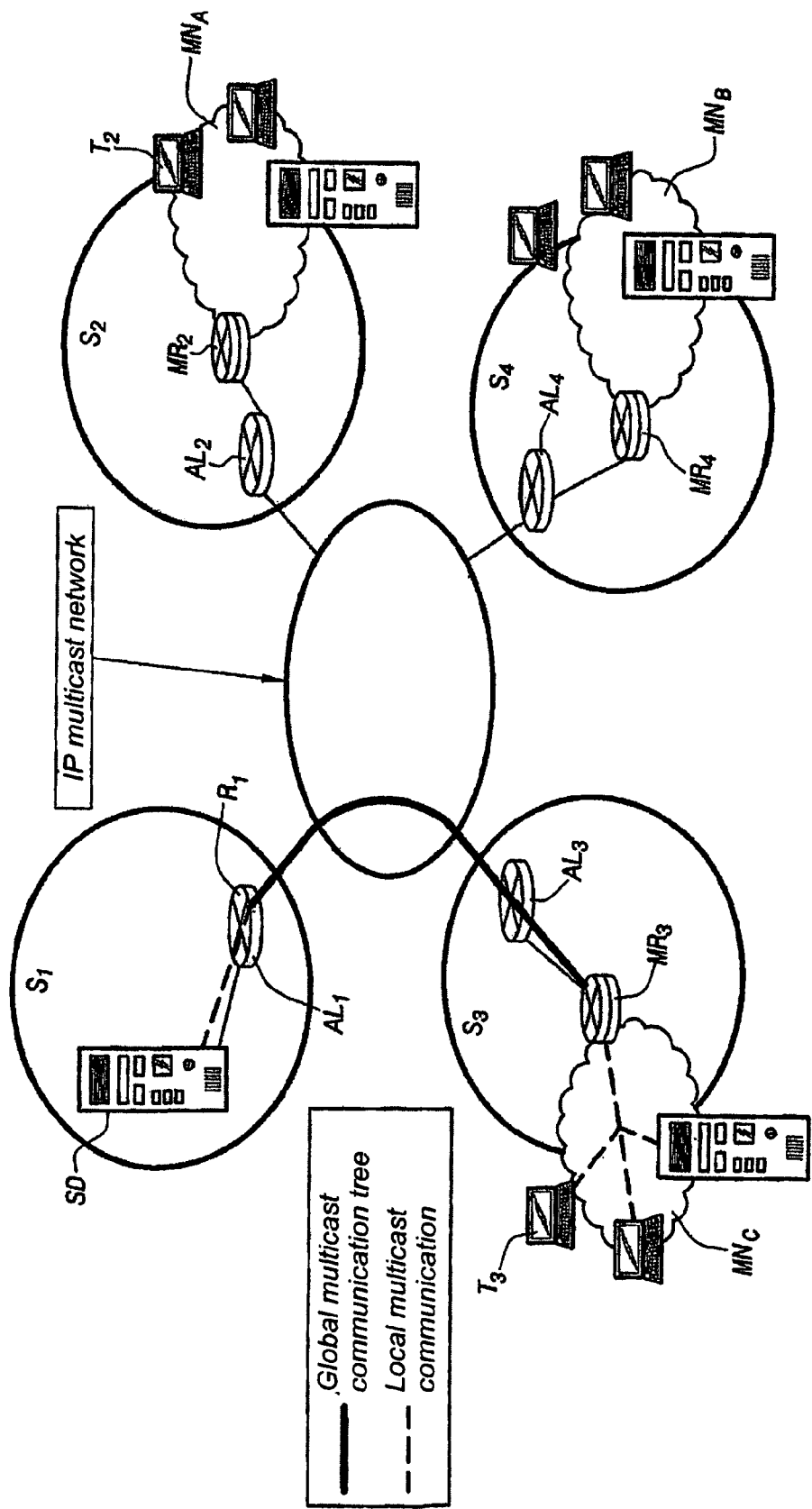
FIGS. 6a, 6b and 6c represent, by way of illustration, various scenarios of implementation of the method that is a subject of the invention, corresponding to different positions of connection of the mobile router associated with a mobile IP network.

The software agent placed on the access router of the home site, agent $AL_1$ on site $S_1$ in FIG. 6a, then triggers the construction of a multicast communication tree between the home site $S_1$ and the mobile router, in order to transform the extended local broadcast as described previously in the description.

The mobile router then accesses or subscribes to this new multicast communication and then retransmits it over the mobile network with which it is associated in the original local broadcast format for example.

Figure 6B:
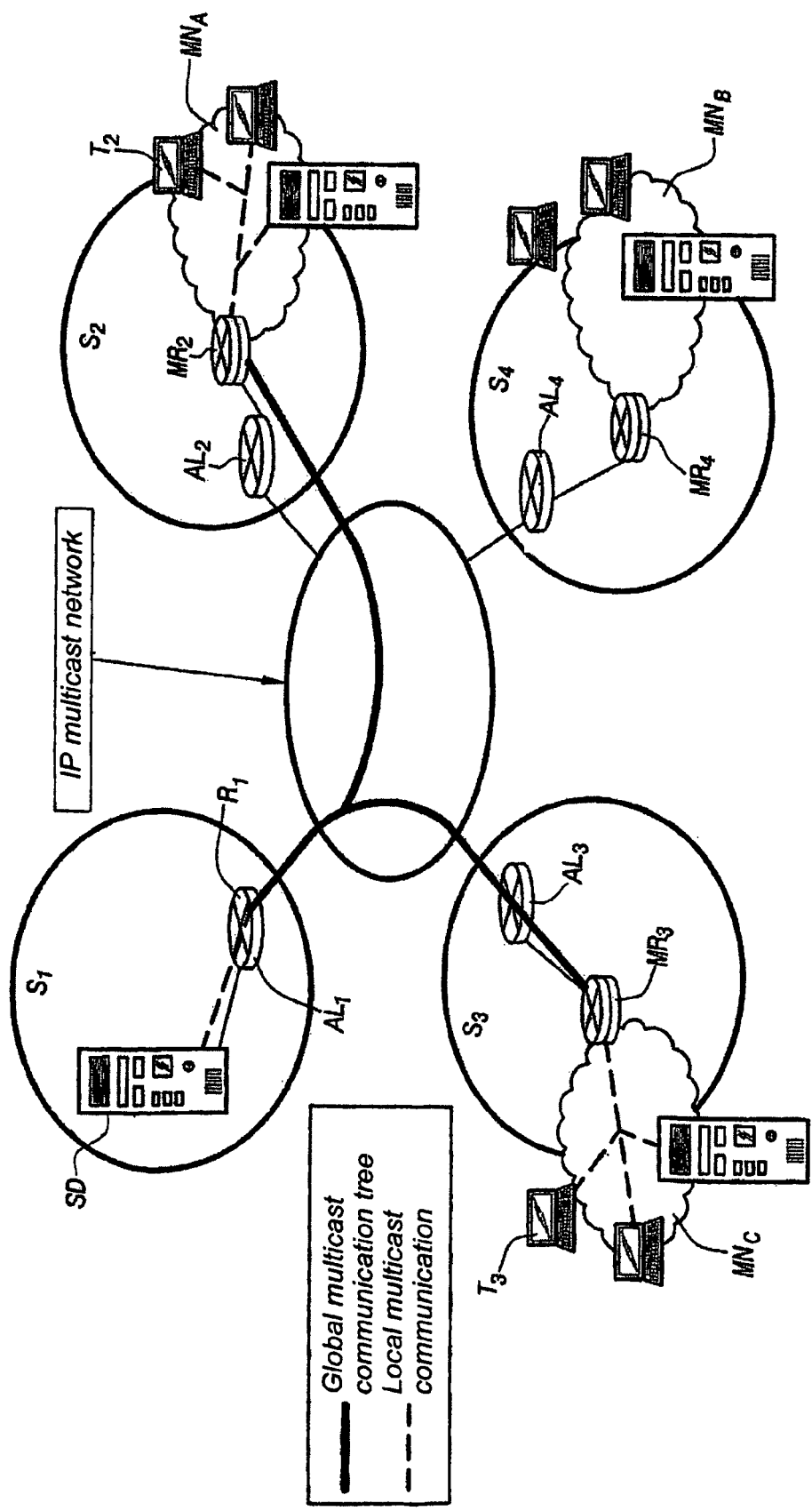
Figure 6C:
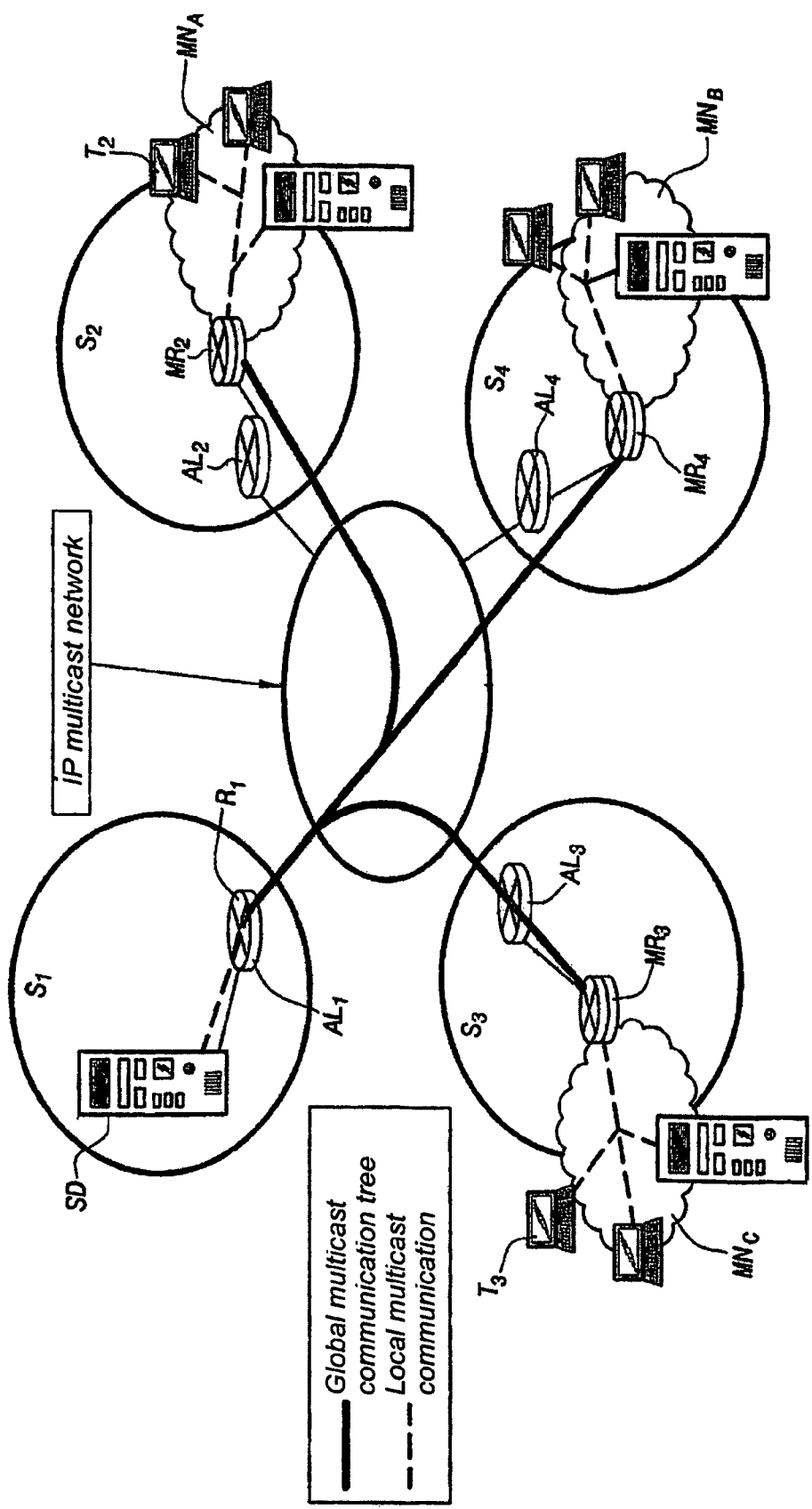

With reference to FIGS. 6a to 6c, it is noted that source SD of the local broadcast is located on site $S_1$. Three mobile routers $MR_2$, $MR_3$ and $MR_4$ are visiting routers on sites $S_2$, $S_3$ and $S_4$ respectively. $AL_1$ denotes the software agent placed on access router $R_1$ of the home site, which manages the mobility of the abovementioned mobile routers. $AL_2$, $AL_3$ and $AL_4$ denote the software agents installed on each of mobile routers $MR_2$, $MR_3$ and $MR_4$, respectively, tasked with managing the multicast subscriptions in mobility scenarios as well as relaying multicast streams to the mobile terminals connected to the corresponding mobile IP network.

The various scenarios represented in FIGS. 6a to 6c are as follows:

Mobile terminal $T_3$ of mobile network $MN_c$ wishes to access the broadcast local to site $S_1$, its own home site, the address of which is $G_1$.

Mobile terminal $T_3$ transmits an IGMP or MLD request to its default router, mobile router $MR_3$.

The function referred to as "MLD proxy" or "IGMP proxy" of $MR_3$ searches for access to the broadcast local to site $S_1$, its own home site, the address of which is $G_1$.

Mobile router $MR_3$ has beforehand located its connection, as described previously in the description, and determined that the multicast address of the broadcast corresponds to a private broadcast restricted to the home site $S_1$.

Consequently, it transmits not the MLD or IGMP access request message but rather the message EMR ($LMD_{1i}$) to software agent $AL_1$ installed in the access router of its home site $S_1$. The abovementioned message includes the address $G_1$ of the broadcast for which access is requested.

Software agent $AL_1$ of $S_1$ receives the message, identifies mobile router $MR_3$ and transmits the offer of access to the extended multicast communication, the address of which is the second substituted address $G_2$ or address $GMD_{1g}$ in FIG. 5.

This address is an address corresponding to a global multicast communication for which access router $R_1$ on site $S_1$ is identified as being the source.

After transmission by mobile router $MR_3$, the access offer acceptance by the message AAO ($GMD_{1g}$) via an MLD or IGMP access or subscription message is transmitted to the access router of site $S_1$ and to software agent $AL_1$. The corresponding extended multicast communication is then propagated through the interconnection network.

At the same time, access router $R_1$ at site $S_1$ which hosts software agent $AL_1$ itself subscribes to the local multicast communication to the address $G_1$ restricted to the site, in order to receive the data from it. After the access offer acceptance message AAO ($GMD_{1G}$) is received, the data of the local multicast communication to the address $G_1$ is made available to the global multicast communication to the address $G_2$ and thus transmitted outside the home site $S_1$.

Software agent $AL_3$ installed in the visiting mobile router $MR_3$ on site $S_3$ then receives the data of the broadcast local to site $S_1$ of address $G_1$, via the global broadcast, i.e. via the extended multicast communication, to address $G_2$.

Software agent $AL_3$ then transforms the global multicast stream into a local transformed multicast stream which is transmitted over mobile network $MN_c$, the mobile terminals, in particular mobile terminal $T_3$, receiving the local multicast communication to the address $G_1$, the implementation mechanism being nevertheless completely transparent to the mobile terminals.

With reference to FIG. 6b, there is now considered a mobile terminal $T_2$ on mobile network $MN_A$ visiting site $S_2$ anticipating accessing the same local broadcast of site $S_1$ of address $G_1$. Terminal $T_2$ therefore transmits an IGMP or MLD request to its default router, mobile router $MR_2$ in FIG. 6b.

The "MLD proxy" or "IGMP proxy" function of the abovementioned mobile router tries to access the same broadcast local to the home site $S_1$, the address of which is $G_1$.

Mobile router $MR_2$ has detected beforehand its location and has checked that the multicast address of the requested broadcast corresponds to a broadcast restricted to the home site $S_1$. It transmits not an MLD or IGMP subscription message, which message would be sent if the requested broadcast were a global broadcast, but rather a message to software agent $AL_1$ installed in the access router of its home site, i.e. router $R_1$. This message naturally contains the address $G_1$ of the requested broadcast.

Software agent $AL_1$ of site $S_1$ receives the abovementioned request message. After mobile router $MR_2$ is identified, the response transmitted to it is used to communicate the global broadcast address, which is $G_2$. Since the corresponding extended multicast communication is already in progress, no other action is to be taken by access router $R_1$ of the home site $S_1$.

With mobile router $MR_2$ having received this response, it accesses in the normal way the global multicast communication of address $G_2$ by transmitting an MLD or IGMP subscription message to its home site access router $R_1$. Since the global multicast communication of address $G_2$ is already in progress on the site interconnection network, a new branch of the global multicast communication tree is created, as represented in FIG. 6b, and mobile router $MR_2$ then receives the data of the broadcast local to site $S_1$ of address $G_1$ via the extended multicast communication, i.e. the global multicast communication of address $G_2$.

Software agent $AL_2$ installed on mobile router $MR_2$ visiting site $S_2$ then receives the data of the broadcast local to site $S_1$ of address $G_1$ via the global broadcast of address $G_2$ and then places the data of the global broadcast of address $G_2$ in the local multicast communication of address $G_1$ which is transmitted over mobile network $MN_A$, in particular to the requesting user terminal $T_2$.

Lastly, with reference to FIG. 6c, there is now considered the scenario in which a mobile network $MN_B$ is visiting site $S_4$ and wishes to subscribe to the same broadcast local to site $S_1$ of address $G_1$. The corresponding mobile router $MR_4$ transmits its access request to software agent $AL_1$ of the home site $S_1$, subscribes to the extended multicast communication executed by the local multicast communication of address $G_2$ and retransmits locally over mobile network $MN_B$ the local multicast communication of address $G_1$, as mentioned previously. The state of the multicast communication tree is represented in FIG. 6c for the overall situation.

It is thus understood that the broadcast remains a global multicast communication from the source, i.e. from broadcast server SD, to the end receiver, i.e. each of mobile routers $MR_3$, $MR_2$ and $MR_4$, without using unicast tunnels or, of course, systematic duplication of broadcast data.

For each broadcast forming the subject of a request on the part of any mobile network, a multicast communication tree is therefore created over the whole of the interconnection network.

The invention claimed is:

1. A method of multicast communication to at least one user mobile terminal of a mobile IP network, via a mobile router equipped with functions for controlling and transmitting accesses by any user terminal to any multicast type communication, comprising:
   connecting the mobile router to the IP network; and
   transmitting a signalling message from the mobile router to the mobile router's home site, subsequent to the proceeding two steps, the performing:
   at the home site,
      discriminating the location of the mobile router in relation to the mobile router's home site, respectively to the mobile router's home organisation, based on the signalling message;
      transmitting to the mobile router an item of location discrimination information; and
   at the mobile router, for any request by a requesting user mobile terminal on the mobile IP network for access to a group multicast communication destined for the home site and relating to a multicast communication local to the home site, respectively to the home organisation, of the mobile terminal,
      substituting for the access request, when the location discrimination information indicates a connection of the mobile router outside the mobile router's home site, respectively outside the mobile router's home organisation, a request for access to an extended multicast communication providing access to the local multicast communication;
      transmitting, to the home site, the request for access to the extended multicast communication;
      receiving and transforming the extended multicast communication into a local transformed multicast communication at the mobile router;
      transmitting the local transformed multicast communication over the mobile IP network to at least the requesting user mobile terminal.

2. A method according to claim 1, wherein the discrimination and transmission steps executed at the home site are replaced, at the mobile router, by a step involving executing a procedure for locating the connection of the mobile router in order to generate a location variable representing the position of the connection of the mobile router in relation to the mobile router's home site, its home organisation or the public Internet.

3. A method according to claim 1, wherein, upon request for access by a requesting user mobile terminal on the mobile IP network to a multicast communication to a first address for multicast communication, before this access request is transmitted by the mobile router, this involves at least:
   discriminating the type of multicast communication provided by the access to the first address; and,
   upon the first address is being an address for global multicast communication,
      directly transmitting the request for access to the first address, by the mobile router transmitting a conventional access request message; otherwise,
   upon the first address being a broadcast address local to the home organisation of the requesting user terminal,
      discriminating, based on a location variable, the position of the connection of the mobile router, and, according to the location of this connection,
      upon the mobile router being connected to a network belonging to the mobile router's home organisation,
         directly transmitting the request for access to the first address, by transmitting a conventional access request message; otherwise;
      upon the mobile router being connected to a network that does not belong to the mobile router's home organisation,
         transmitting, from the mobile router to the machine of the home site of the requesting user mobile terminal, managing accesses by moving mobile terminals, a message requesting remote access to a second address for global multicast communication accessible at the location address of the mobile router; and, after the mobile router has received the second address, subscribing to the global multicast communication stream emanating from the second address; transforming the global multicast communication stream received from the second address into a local transformed multicast communication stream, accessible locally on the mobile IP network at the first address; and transmitting the local transformed multicast communication stream from the mobile router to at least the requesting user mobile terminal.

4. A method according to claim 3, wherein upon the first address being a broadcast address local to the home site of the requesting user mobile terminal, this additionally involves:

discriminating, based on the location variable, the position of the connection of the mobile router, and, according to the location of this connection, upon the mobile router being connected to a network belonging to the mobile router's home site, directly transmitting the request for access to the first address, by transmitting a conventional access request message; otherwise;

upon the mobile router turns out to be connected to another network not belonging to the mobile router's home site, transmitting, from the mobile router to the machine of the home site of the requesting user mobile terminal, managing accesses of moving mobile terminals, a message requesting remote access to a second address for global multicast communication accessible at the location address of the mobile router; and, after the mobile router has received the second address, subscribing to the global multicast communication stream emanating from the second address;

transforming the global multicast communication stream received from the second address into a local transformed multicast communication stream, accessible locally on the mobile IP network at the first address; and, transmitting the local transformed multicast communication stream from the mobile router to at least the requesting user mobile terminal.

5. A method according to claim 3, wherein the remote access request message transmitted by the mobile router is a request for access to an extended multicast communication formed either by a global multicast communication request message, or by a local multicast communication request message for a multicast communication local to the home organisation of the requesting user mobile terminal.

6. A method according to claim 1, wherein for a mobile router capable of operating at least one of inside and outside the mobile router's home attachment network, there being allocated to the mobile router, by the home attachment site, an internal permanent address for any networked connection of this mobile router to a site belonging to this home attachment network and an internal temporary address for any networked connection of this terminal to another site belonging to this home organisation, and, by any foreign site not belonging to the home organisation, an external temporary address for any networked connection of the mobile router to the foreign site, the addresses forming, for the mobile router, a location reference, the step involving discriminating the location of the mobile router in relation to the mobile router's site, respectively to the mobile router's home location, involves at least:

comparing, for identification, the location reference with the address values of one at least of the sets formed by the set of internal permanent addresses allocated to the set of mobile routers attached to this home attachment network and capable of operating in this home attachment network, and by the set of internal temporary addresses allocated to this set of mobile routers for any connection to another site belonging to the home organisation; and establishing at least the location discrimination information of the mobile router indicating either the connection of the mobile router to the mobile router's home attachment network, upon identification of the location reference in the set of internal permanent addresses, or the connection of the networked mobile router to another site belonging to the home organisation, upon identification of the location reference in the set of internal temporary addresses, or the connection of the networked mobile terminal to a foreign site not belonging to the home organisation, upon a lack of identification of the location reference in both the set of internal permanent addresses and the set of internal temporary addresses.

7. A method according to claim 5, wherein the step involving transmitting a request for access to an extended multicast communication based on a multicast information communication local to the home organisation, respectively to the home site, of the mobile terminal, this local multicast communication being generated by an information broadcast source installed at a first address for local multicast information communication in this home site, involves:

transmitting from the mobile router to the home site an extended multicast information communication request message, containing at least the first address for local multicast information communication and an identification code for the mobile router; and, after the home site identifies the mobile router, transmitting, from the home site to the mobile router, an access offer message containing at least a second address for global multicast information communication, the broadcast source of which is identified in the home site; and, after the mobile router receives the access offer message, transmitting, from the mobile router to the home site, an access offer acceptance message for access to the information being broadcast to the second address for global multicast information communication; and, after the access offer acceptance message is received at the home site, transferring the information to be broadcast from the first to the second broadcast address; and transmitting, by global multicast communication, the information to be broadcast under the second address, thereby enabling the mobile router interconnected to a site not belonging to the home site, respectively to the home organisation, to receive on the site the information being broadcast under the first address in local multicast mode, broadcast under the second address in global multicast mode.

8. A method according to claim 2, wherein, upon request for access by a requesting user mobile terminal on the mobile IP network to a multicast communication to a first address for multicast communication, before this access request is transmitted by the mobile router, this involves at least:

discriminating the type of multicast communication provided by the access to the first address; and, upon the first address being an address for global multicast communication,
    directly transmitting the request for access to the first address, by the mobile router transmitting a conventional access request message; otherwise,
upon the first address being a broadcast address local to the home organisation of the requesting user terminal, discriminating, based on the location variable, the position of the connection of the mobile router, and, according to the location of this connection,
    upon if the mobile router being connected to a network belonging to the mobile router's its home organisation,
        directly transmitting the request for access to the first address, by transmitting a conventional access request message; otherwise;
    upon the mobile router being connected to a network that does not belong to the mobile router's home organisation,
        transmitting, from the mobile router to the machine of the home site of the requesting user mobile terminal, managing accesses by moving mobile terminals, a message requesting remote access to a second address for global multicast communication accessible at the location address of the mobile router; and, after the mobile router has received the second address, subscribing to the global multicast communication stream emanating from the second address;
        transforming the global multicast communication stream received from the second address into a local transformed multicast communication stream, accessible locally on the mobile IP network at the first address; and
        transmitting the local transformed multicast communication stream from the mobile router to at least the requesting user mobile terminal.

9. A method according to claim 4, wherein the remote access request message transmitted by the mobile router is a request for access to an extended multicast communication formed either by a global multicast communication request message, or by a local multicast communication request message for a multicast communication local to the home organisation of the requesting user mobile terminal.

10. A method according to claim 6, wherein the step involving transmitting a request for access to an extended multicast communication based on a multicast information communication local to the home organisation, respectively to the home site, of the mobile terminal, this local multicast communication being generated by an information broadcast source installed at a first address for local multicast information communication in this home site, involves:
    transmitting from the mobile router to the home site an extended multicast information communication request message, containing at least the first address for local multicast information communication and an identification code for the mobile router; and, after the home site identifies the mobile router,
    transmitting, from the home site to the mobile router, an access offer message containing at least a second address for global multicast information communication, the broadcast source of which is identified in the home site; and, after the mobile router receives the access offer message,
    transmitting, from the mobile router to the home site, an access offer acceptance message for access to the information being broadcast to the second address for global multicast information communication; and, after the access offer acceptance message is received at the home site,
    transferring the information to be broadcast from the first to the second broadcast address; and
    transmitting, by global multicast communication, the information to be broadcast under the second address, thereby enabling the mobile router interconnected to a site not belonging to the home site, respectively to the home organisation, to receive on the site the information being broadcast under the first address in local multicast mode, broadcast under the second address in global multicast mode.

11. A mobile router equipped with functions for controlling and transmitting access requests by any user mobile terminal connected to a mobile IP network managed by the mobile router, this mobile network including at least one user mobile terminal interconnected to this mobile IP network, the mobile router comprising:
    means for discriminating the type of multicast communication requested by any request for access to a multicast communication transmitted by the requesting user mobile terminal;
    means for substituting, according to a location variable of the connection of the mobile router outside the mobile router's home site, respectively outside the mobile router's home organisation, for any request for access to a group multicast communication to the home site and relating to a multicast communication local to the home site, respectively to the home organisation, of the mobile terminal, a request for access to an extended multicast communication providing access to the local multicast communication; and
    means for transforming any received extended multicast communication into a local transformed multicast communication.

12. A mobile router according to claim 11, wherein the means for transforming the received extended multicast communication into a local transformed multicast communication comprise substitution means for the address for global multicast communication for which there is substituted an address for local transformed multicast communication.

13. A mobile router according to claim 11, wherein the mobile router comprises means for transmitting and receiving IP messages, the receiving means permitting at least the reception of the location information in the access offer message, and the extended multicast communication, the transmission means permitting at least the transmission of the extended multicast information communication request message, the access offer acceptance message, and the local transformed multicast communication stream over the mobile IP network to at least the requesting user mobile terminal.

14. A mobile router according to claim 12, wherein the mobile router comprises means for transmitting and receiving IP messages, the receiving means permitting at least the reception of the location information in the access offer message, and the extended multicast communication, the transmission means permitting at least the transmission of the extended multicast information communication request message, the access offer acceptance message, and the local transformed multicast communication stream over the mobile IP network to at least the requesting user mobile terminal.

15. A non-transitory computer readable storage medium with a computer program stored thereon, executed by a computer in the form of a software agent, wherein said computer program includes at least one software module set up to:
    receive location discrimination information;

substitute for an access request by a requesting user mobile terminal on an IP network, when the location discrimination information indicates a mobile router connection outside the mobile router's home site, respectively outside the mobile router's home organisation, a request for access to an extended multicast communication providing access to a local multicast communication;

transmitting, to the home site, the request for access to the extended multicast communication;

receiving and transforming the extended multicast communication into a local transformed multicast communication at the mobile router; and transmitting the local transformed multicast communication over the mobile IP network to at least the requesting user mobile terminal.

16. A non-transitory computer readable storage medium according to claim 15, wherein the transformation software module includes at least one substitution module for the address for global multicast communication for which there is substituted an address for local transformed multicast communication.

* * * * *